US012629649B2

(12) United States Patent
Saravanos et al.

(10) Patent No.: US 12,629,649 B2
(45) Date of Patent: May 19, 2026

(54) SYSTEMS AND METHODS FOR FEEDING INLET MATERIALS TO A PROCESS SYSTEM

(71) Applicant: SARAVANOS PROCESS++ SRL, Ixelles (BE)

(72) Inventors: Panagiotis Saravanos, Karystos (GR); Ioannis Saravanos, Zaventem (BE)

(73) Assignee: SARAVANOS PROCESS++ SRL, Ixelles (BE)

( * ) Notice: Subject to any disclaimer, the term of this patent is extended or adjusted under 35 U.S.C. 154(b) by 0 days.

(21) Appl. No.: 18/847,805

(22) PCT Filed: Mar. 16, 2023

(86) PCT No.: PCT/EP2023/056775
§ 371 (c)(1),
(2) Date: Sep. 17, 2024

(87) PCT Pub. No.: WO2023/175088
PCT Pub. Date: Sep. 21, 2023

(65) Prior Publication Data
US 2025/0196083 A1 Jun. 19, 2025

(30) Foreign Application Priority Data
Mar. 17, 2022 (EP) ..................................... 22162656

(51) Int. Cl.
*B01J 4/00* (2006.01)
*B01J 19/00* (2006.01)
*B01J 19/24* (2006.01)
(52) U.S. Cl.
CPC ............... *B01J 4/008* (2013.01); *B01J 4/007* (2013.01); *B01J 19/002* (2013.01);
(Continued)

(58) Field of Classification Search
CPC .............. B01J 4/008; Y10T 137/85954; Y10T 137/86139; B01F 35/71805
See application file for complete search history.

(56) References Cited

U.S. PATENT DOCUMENTS 4,007,755 A * 2/1977 Lerner ................. G05D 11/132
137/551
4,585,169 A * 4/1986 Kinsey ...................... F23K 5/04
239/126
(Continued)

FOREIGN PATENT DOCUMENTS

DE 102018218440 A1 4/2020
WO 2014078398 A1 5/2014

OTHER PUBLICATIONS

International Search Report and Written Opinion from International Application No. PCT/EP2023/056775 dated May 25, 2023.

*Primary Examiner* — Kevin F Murphy
(74) *Attorney, Agent, or Firm* — Workman Nydegger

(57) ABSTRACT

A feeding system for feeding an inlet material to a process system, comprising a pressure force unit, upstream of a flow force unit, configured to increase a pressure of an inlet material flow; and an upstream control valve configured to subject the inlet material flow to a pressure-drop; a control unit configured to control a start-up of the feeding system by: circulating the inlet material flow in a circulation loop, while a valve system is arranged in the first position; increase the pressure of the inlet material flow; subject the inlet material flow to a first pressure-drop: when the inlet material flow is circulating, arrange the valve system in the second position; subject the inlet material flow to a second pressure-drop, wherein the first pressure-drop is greater than the second pressure-drop.

21 Claims, 7 Drawing Sheets

Figure 2A:
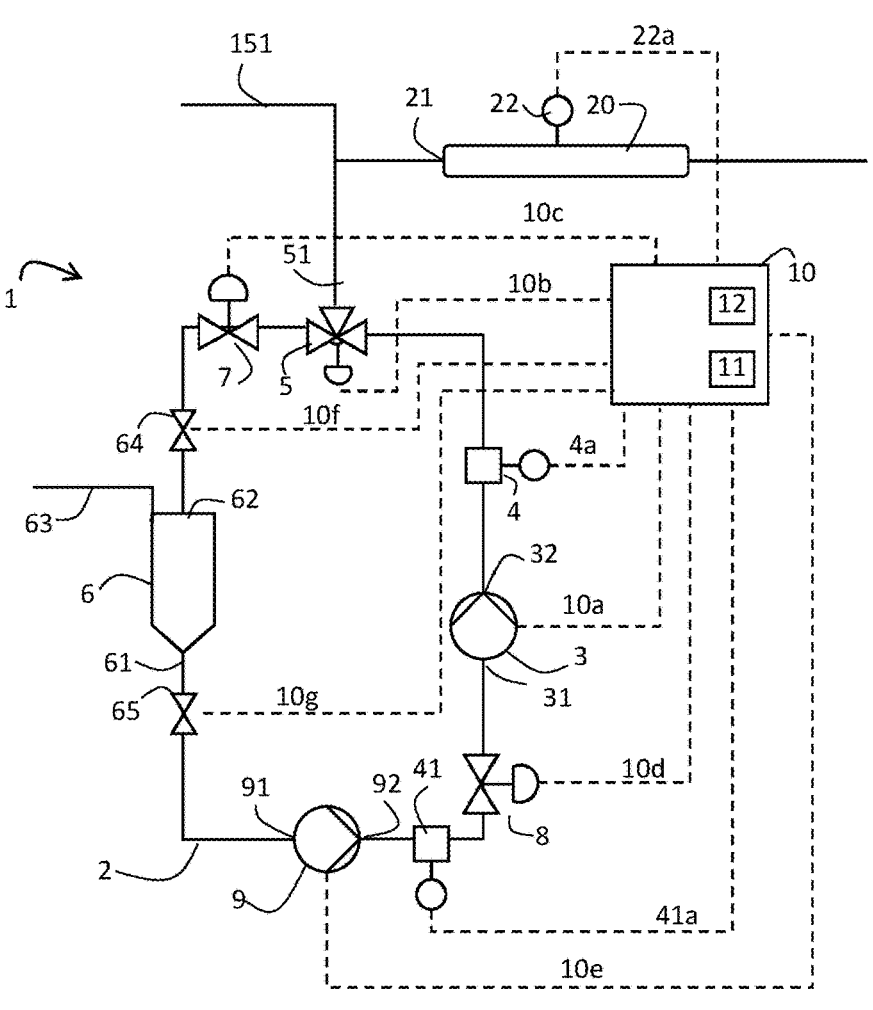

(52) U.S. Cl.
CPC ...... *B01J 19/2465* (2013.01); *B01J 2204/002*
(2013.01); *B01J 2219/00162* (2013.01); *B01J*
*2219/00164* (2013.01); *B01J 2219/00198*
(2013.01); *B01J 2219/00231* (2013.01); *B01J*
*2219/00243* (2013.01); *Y10T 137/85954*
(2015.04); *Y10T 137/86139* (2015.04)

(56) References Cited

U.S. PATENT DOCUMENTS

| | | | | |
|---|---|---|---|---|
| 4,653,532 | A * | 3/1987 | Powers | B05B 9/0406 |
| | | | | 137/563 |
| 6,220,296 | B1 * | 4/2001 | Ragsdale | B01F 35/712 |
| | | | | 137/563 |
| 6,273,120 | B1 * | 8/2001 | Hofmann | B01D 53/9495 |
| | | | | 137/98 |
| 8,091,575 | B2 * | 1/2012 | Gammon | G05D 11/132 |
| | | | | 137/115.03 |
| 2003/0100247 | A1 | 5/2003 | Kim et al. | |

* cited by examiner

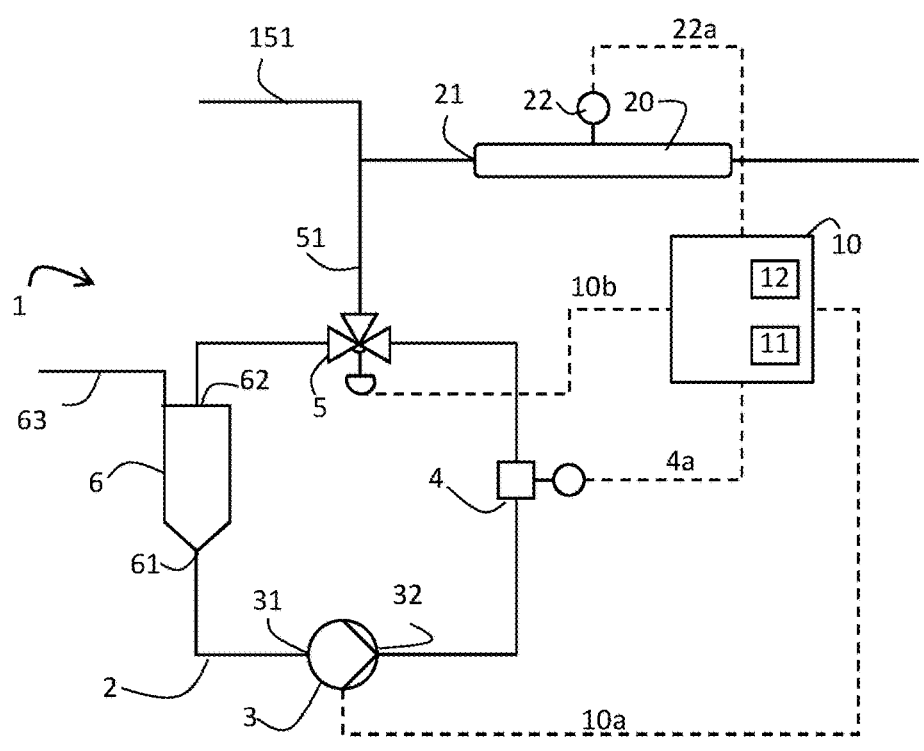
Fig. 1a
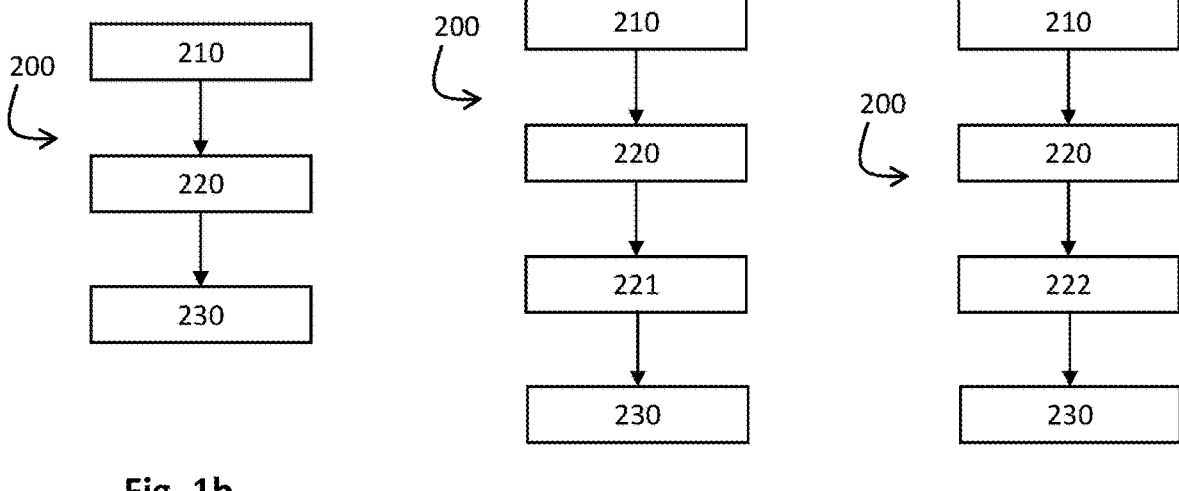
Fig. 1b
Fig. 1c
Fig. 1d

1000

101

110c

163

62
107
105
104
104a

110b

106

103
132

131
110a

161

191    192
110d

102

108

109

151

110e

10c

10

22a 21    22    20

1

51
10b

63

62
7

4
4a 5
32

6

3
31
10a

61

91    92

2

8    10d

9

10e

SYSTEMS AND METHODS FOR FEEDING INLET MATERIALS TO A PROCESS SYSTEM

CROSS-REFERENCE TO RELATED APPLICATIONS

This patent application is a nationalization of and claims priority to PCT Application No. PCT/EP2023/056775 filed on Mar. 16, 2023, and entitled SYSTEMS AND METHODS FOR FEEDING INLET MATERIALS TO A PROCESS SYSTEM, which claims priority to Europe patent application Ser. No. 22/162,656.7, filed Mar. 17, 2022. Each of the aforementioned applications is incorporated by reference herein in their entirety.

The present invention relates to the field of continuous process systems, in particular to methods and systems for feeding inlet materials to such systems and/or to starting such systems.

In a process system at least one inlet material, often more than one inlet material, is fed to a process system. In the process system, the one or more inlet materials are subjected to a process, e.g. a reaction, blending, or mixing. To achieve a successful process, generally meaning that the output of the process is within a desired specification, several conditions must be fulfilled. For example, it may be desired that the flow rate, pressure, temperature, etc., of the one or more inlet materials are within desired ranges.

In practice, the process in the process system is stopped regularly, for various reasons. Thereafter, the process system must be started again. During such start-up, the flow of the one or more inlet materials increases towards the desired conditions. The period before these desired conditions are reached is often referred to as the start-up period. During this start-up period, the result of the process is not within the desired specification. In some cases it can be subjected to a new or further process, in other cases it may be removed as waste.

It is an object of the invention to reduce the start-up period and/or improve stability of the process, or at least provide an alternative to the prior art.

This object is achieved with a feeding system for feeding an inlet material to a process system, comprising a material vessel configured to receive the inlet material;

a circulation loop for circulating an inlet material flow comprising at least the inlet material, wherein the circulation loop comprises:

a flow force unit configured to control a flow rate of the inlet material flow;

a valve system configured to be fluidly connected to a process system inlet of the process system, wherein the valve system has at least:

a first position for circulating the inlet material flow in the circulation loop; and a second position for guiding the inlet material flow to the process system inlet.

The invention thus relates to a feeding system. The feeding system is used for feeding an inlet material to a process system. The process system is configured to subject the inlet material to a process. The process can be any type of process, e.g. a reaction, a mixing process, a blending process, a post-differentiation process, a post-dilution process, a post-mixing process, a dispersion process.

The process system can be any type of suitable process system. The process system can e.g. be a continuous process system. The process system can e.g. be a continuous reactor. The process system can e.g. be a tubular reactor, e.g.

configured to apply a plug-flow reaction. The process system can e.g. be a continuous stirred-tank reactor. The process system can e.g. be a mixer. The process system can e.g. be a blender. The process system can e.g. be a system configured to subject the inlet material to a post-differentiation process, a post-dilution process, a post-mixing process, a dispersion process. Optionally, the feeding system can be part of a process system. Optionally, the process system may comprise further systems for feeding further inlet materials to the process system. Optionally, the process system may comprise means for controlling properties of the inlet materials for controlling the process, e.g. means for controlling temperature or pressure.

The inlet material may e.g. be reactant. The inlet material may e.g. be an ingredient. The inlet material may e.g. be an inlet stream. The inlet material may e.g. be a material train. The inlet material may e.g. a liquid. The inlet material may e.g. be a solid, that is dissolved, dispersed, or diluted in a liquid. The inlet material may e.g. be a dispersed material.

The feeding system comprises a material vessel. The material vessel can be any type of tank that is suitable to hold the inlet material. In some cases the inlet material may be provided in the material vessel after being diluted, e.g. in a liquid. The material vessel can e.g. be configured to receive the inlet material continuously or in batches. The material vessel can e.g. be fluidly connected to a main material vessel and be configured to receive the inlet material from said main material vessel, wherein optionally said main material vessel is larger than the material vessel. Optionally one or more transfer elements such as pumps may be provided between the material vessel and the main material vessel. The material vessel can e.g. be fluidly connected to an inlet material production system and be configured to receive the inlet material from said inlet material production system. The material vessel can e.g. comprise a material outlet. Optionally, a shut-off valve is provided at the material outlet to control when inlet material can be removed from the material vessel. The material vessel can e.g. be a tank, a break tank, or a column (e.g. a gas column separator). Optionally the material vessel comprises a gas/liquid separation system. Optionally the material vessel comprises a deaeration system.

The feeding system further comprises a circulation loop. In the circulation loop, an inlet material flow can be circulated. The inlet material flow comprises at least the inlet material. Optionally the inlet material flow also comprises a diluent for diluting the inlet material. In embodiments, the material vessel may be arranged in the circulation loop. In such cases, the material vessel can e.g. comprise a material outlet and a material inlet, wherein the circulation loop is configured to circulate the inlet material flow from said material outlet to the material inlet. However, it is also possible that the material vessel comprises a material outlet fluidly connected to the circulation loop. The circulation loop may then be configured to circulate the inlet material flow without returning it into the material vessel.

The circulation loop is configured for allowing the inlet material flow. It may be embodied in any suitable way depending on the inlet material and expected conditions such as temperature and pressure. For example, the circulation loop may comprise piping or tubing with any suitable diameter and pressure rating. For example, the circulation loop may comprise any suitable material, e.g. steel, stainless steel, or plastics. Besides components mentioned herein, the circulation loop may comprise any useful components, such as shut-off valves, sample valves, a sight glasses, sensors, flanges, thermal heating, thermal insulation, electrical insulation, etc. These considerations also hold for any other components mentioned herein for guiding a flow, regardless of whether this is referred to as "loop", "pipe", "line", "tube", or any other similar terminology.

The circulation loop comprises a flow force unit. The flow force unit is configured to cause the inlet material flow. The flow force unit may further be configured to control a flow rate of the inlet material flow. The flow force unit may be any type of suitable component. For example, if the inlet material flow is a liquid flow, the flow force unit may be a pump. For example, the flow force unit may be a positive displacement pump. For example, the flow force unit may be a pump with intermediate behavior between a positive displacement pump and a centrifugal pump. The flow force unit may have a flow force unit inlet fluidly connected to the material vessel, e.g. to a material outlet of the material vessel, optionally via one or more intermediate components. In addition to sensors that are described herein, when a flow force unit is being used, the system may further comprise a pressure sensor configured to measure the pressure downstream of the flow force unit. This may protect against overpressures.

The circulation loop comprises a valve system. The valve system may comprise one or more valves. The valves may be any type of suitable valve, e.g. two-way valve or three-way valve, change-over valves, butterfly valves, ball valves, globe valves, gate valves. The valve system may comprise one or more actuators for controlling the one or more valves. Said actuators may be any type of suitable actuator, e.g. electric or pneumatic. The valve system has at least a first position and a second position between which it can be switched. In the first position the inlet material flow is circulated in the circulation loop. The inlet material is not guided towards the process system inlet. For example, the valve system may guide the flow towards a material inlet of the material vessel in said first position. In the second position, the inlet material flow is no longer circulated. Instead, it is guided towards the process system inlet. Thus, in the second position the inlet material is provided to the process system, such that the process can take place. The valve system may e.g. be arranged downstream of the flow force unit.

The invention thus provides a feeding system, having a circulation loop. The valve system allows to either circulate the inlet material flow in the circulation loop or provide it towards the process system. As such it can be avoided that the inlet material is fed to the process system at undesired moments, thereby reducing the waste. Moreover, the inlet material flow can at start-up first be circulated in the circulation loop before being fed to the process system. This reduces the start-up period in the process system and as such reduces waste.

The feeding system can further be supplemented with additional features in optional embodiments to improve start-up, reduce the start-up period, and/or improve control, as elaborated on below. These embodiments can advantageously be combined with each other.

In embodiments, the feeding system further comprises a control unit. The control unit can for example be configured to control the flow force unit and the valve system. For example, the control unit can be configured to control a start-up of the feeding system by starting the force unit for circulating the inlet material flow in the circulation loop, while the valve system is arranged in the first position, and optionally when the inlet material flow is circulating, arrange the valve system in the second position.

The control unit may e.g. comprise a processing unit to process signals or measurements. The control unit may e.g. comprise a memory for storing information, such as data, measurements, and/or computer-readable instructions. The control unit may comprise one or more input terminals for receiving input signals and/or measurement signals. The control unit may comprise one or more output terminals for communicating output signals and/or control signals. The control unit may be configured to communicate, wired or wireless, with a user equipment device, such as a computer, tablet, smartphone. The control unit may be embodied in any suitable way, including a programmable logic controller (PLC), integrated circuit, a microcontroller, or computer. The control unit may control components with control signals, which can be communicated wired or wireless according to any suitable communication method or protocol. The control unit may comprise one or more input terminals, output terminals, or communication terminals for communicating with other components.

In embodiments, the circulation loop comprises a pressure force unit configured to increase a pressure of the inlet material flow. The pressure force unit can e.g. be arranged upstream of the valve system. The pressure force unit can e.g. be arranged upstream of the flow force unit. The pressure force unit may further be configured to control a pressure of the inlet material flow. The pressure force unit may be any type of suitable component. For example, if the inlet material flow is a liquid flow, the pressure force unit may be a pump, for example a centrifugal pump. The pressure force unit may have a pressure force unit inlet fluidly connected to the material vessel, e.g. to a material outlet of the material vessel. The pressure force unit may e.g. be arranged upstream of the valve system. In addition to sensors that are described herein, when a pressure force unit is being used, the system may further comprise a pressure sensor configured to measure the pressure downstream of the pressure force unit. This may protect against overpressures.

The combination of the pressure force unit and the flow force unit allows to decouple the pressure control and the flow control. This allows to control the inlet material flow more accurately and be more robust for changes.

In embodiments, the circulation loop further comprises an upstream control valve. The upstream control valve is arranged upstream of the valve system. The inlet material flow thus flows through the upstream control valve both when the valve system is in the first position and when the valve system is in the second position. The inlet material flow can thus be subjected to a pressure-drop by the upstream control valve when the inlet material flow is circulating as well as when the inlet material flow is fed to the process system. The upstream control valve can be arranged in a plurality of positions for subjecting the inlet material flow to mutually different pressure-drops. The upstream control valve can e.g. comprise an actuator, e.g. pneumatic or electric, for arranging the upstream control valve in said plurality of positions.

When the circulation loop comprises a pressure force unit, the upstream control valve can e.g. be arranged downstream of the pressure force unit. Optionally, the upstream control valve is arranged upstream of the flow force unit. Optionally, the upstream control valve is arranged downstream of the flow force unit. The upstream control valve may e.g. be configured to subject the inlet material flow to a pressure-drop which can e.g. be adapted. The upstream control valve may e.g. be a pressure sustaining valve. The control unit may e.g. be configured to control the upstream control valve e.g.

for controlling said pressure-drop. The upstream control valve may e.g. be configured to controlling the pressure of the inlet material flow downstream of the upstream control valve.

In embodiments, the control unit is configured to control the upstream control valve to subject the inlet material flow to a first pressure-drop when the flow force unit is started; and to a second pressure-drop after the valve system has been arranged in the second position. The first pressure-drop is greater than the second pressure-drop. Optionally the second pressure-drop is zero and/or corresponds to a setting of the upstream control valve at which it is configured to exert the lowest possible pressure-drop. The pressure-drop is thus reduced after the valve system has been arranged in the second position. In practice, when the valve system is arranged into the second position, the inlet material flow is directed into at least partially empty components such as piping, valves, and the process system. It is possible that there was no flow in these components earlier, or it is possible that there already was some flow, e.g. a further inlet material flow, but that the flow is increased by the inlet material flow. In either case, initially the inlet material flow flowing into these components will encounter an inertia or liquid hammer effect which may cause a pressure wave. This pressure wave can be compensated by the upstream control valve, such that the flow deviation of the flow force unit can be limited.

Optionally, the control unit is configured to control the upstream control valve to gradually transition from the first pressure-drop to the second pressure-drop. The gradual transition may reduce start-up effects.

In embodiments, the control unit is configured to control a start-up of the feeding system by: starting the flow force unit for circulating the inlet material flow in the circulation loop, while the valve system is arranged in the first position; control the pressure force unit to increase the pressure of the inlet material flow; control the upstream control valve to subject the inlet material flow to a first pressure-drop. The control unit may further be configured to when the inlet material flow is circulating, arrange the valve system in the second position (e.g. while still subjecting the inlet material flow to the first pressure-drop with the upstream control valve). Thus, during start-up the pressure of the inlet material flow is increased with the pressure force unit and then lowered again by the pressure-drop of the upstream pressure control valve. Advantageously, this allows to absorb a pressure wave due to inertia or liquid hammer effect that can occur when the valve system is arranged from the first to the second position. Since the liquid hammer effect is absorbed, it is possible to switch the valve system faster, and thus reduce the start-up period. Furthermore, by providing both the pressure force unit and the flow force unit, the pressure control and flow control are decoupled. The pressure hammer effect can thus be absorbed without affecting the flow control of the inlet material flow, which can still be accurate to improve the process and/or reduce the start-up period.

Optionally, the control unit is configured to, after the valve system has been arranged in the second position, control the upstream control valve to subject the inlet material flow to a second pressure-drop, wherein the first pressure-drop is greater than the second pressure-drop. Optionally the second pressure-drop is zero or as small as the upstream control valve allows. As no liquid hammer effect occurs when the process is the steady state, it is advantageous to reduce the energy loss of the pressure-drop in the upstream control valve.

Optionally the control unit is configured to control the pressure force unit to reduce the pressure increase after the valve system has been arranged in the second position. For example, the pressure force unit may be configured to subject the inlet material flow to a first pressure increase when the valve system is in the first position; and to a second pressure increase after the valve system has been arranged in the second position, wherein the first pressure increase is greater than the second pressure increase. As no liquid hammer effect occurs when the process is the steady state, it is advantageous to reduce the energy usage for accomplishing the pressure increase with the pressure force unit.

In embodiments, the circulation loop comprises a circulation sensor. The circulation sensor measures a first property of the inlet material flow. For example, if the circulation sensor is a pressure sensor said first property is a pressure. In that case, the circulation sensor can be any type of suitable pressure sensor, e.g. a potentiometric, inductive, capacitive, piezoelectric, strain gauge, or variable reluctance pressure sensor. For example, if the circulation sensor is a flow rate sensor said first property is a flow rate. In that case, the circulation sensor can be any type of suitable flow rate sensor, e.g. a mass flow sensor, a volumetric flow sensor, a positive displacement flow sensor, a velocity flow sensor such as a mechanical, electromagnetic, vortex, or ultrasonic flow sensor. Based on the measured first property, the circulation sensor is configured to generate a circulation sensor signal. The circulation sensor signal represents the measured first property. Optionally, the circulation sensor is arranged upstream of the valve system. Optionally, the circulation sensor is arranged downstream of the flow force unit, for example when the circulation sensor is a flow rate sensor. Optionally, the circulation loop comprises a first circulation sensor, e.g. being a pressure sensor, and a second circulation sensors, e.g. being a flow rate sensor.

In embodiments, the control unit is configured to receive the circulation sensor signal. The communication between the control unit and the circulation sensor can be according to any suitable communication method, e.g. wired or wireless. Based on the circulation sensor signal, the control unit controls the valve system between the first and the second position. By controlling the valve system based on the circulation sensor, it can be ensured that the inlet material flow is only provided to the process system when the first property is as desired. This avoids or at least reduces that inlet material flow outside of desired conditions is supplied to the process system, and as such reduces the output of the process system that is outside of the specifications. Thus, waste can be reduced.

In embodiments, the control unit is configured to, during the start-up of the feeding system, arranging the valve system in the second position when the circulation sensor signal indicates that the first property is within a specification range.

Thus, at the moment the force unit is started, the valve system is in the first position. The inlet material flow generated by the force unit is thus circulated in the circulation loop. While it is circulating, the circulation sensor is configured to measure the first property and to generate the circulation sensor signal. The control unit is configured to receive this circulation sensors signal and can determine the first property. The control unit is configured to keep the valve system in the first position and maintain the circulation of the inlet material flow, until the first property reaches the specification range. The specification range corresponds to a desired range of values of the first property of the inlet material flow. For example, when the inlet material flow is provided to the process system while the first property is within the specification range, the output of the process system is within the desired specification. By only providing the inlet material flow when the first property is within the specification range, the process can be performed within specifications and the waste can be reduced. Moreover, it has been found that the start-up period can be reduced and thus the start-up of the process can be achieved faster. The control unit may e.g. comprise a memory for storing the specification range. The specification range may e.g. be a predetermined range, e.g. inputted by an operator, or may e.g. be determined as explained herein.

In embodiments, the control unit is configured to receive a process sensor signal from a process sensor configured to measure a second property of a process flow downstream of the feeding system, said process flow comprising at least the inlet material. The process flow may e.g. comprise the inlet material flow and a further inlet material flow, said further inlet material flow comprising a further inlet material. The process system is configured to subject the process flow to a process. The process sensor measures the second property of the process flow. For this, the process sensor can e.g. be arranged to measure said second property upstream of the process system, in the process system, or downstream of the process system. For example, if the second property is a pressure, the process sensor may be a pressure sensor. For example, if the second property is a flow rate, the process sensor may be a flow rate sensor. The process sensor can be embodied as any suitable sensor, for example similarly to the examples given above for the circulation sensor. Optionally the process sensor and the circulation flow are similar types of sensors, e.g. both pressure sensors or both flow rate sensors. Optionally, the control unit is configured to receive a first process sensor signal from a first process sensor, e.g. being a pressure sensor, and a second process sensor signal from a second process sensor, e.g. being a flow rate sensor.

In embodiments, the control unit is configured to determine the specification range based on the process sensor signal received during one or more prior processes in the process system, e.g. when a respective prior process is in a steady state. For example, the control unit may be configured to determine the specification range during said one or more prior processes and may comprise a memory for storing the specification range. For example, the control unit may have a memory for storing, during said on or more prior processes, the process sensor signals, or the second properties determined based on the process sensor signals, and be configured to determine the specification range based thereon.

By assessing said one or more prior processes, the control unit can determine what the value of the second property is during the process, e.g. in the steady state of the process. The steady state e.g. corresponds to when output of the process is within the desired specification. When the process is in the steady state, the start-up period has ended. The control unit can be configured to adapt the specification range such that the steady state is reached faster after the valve system has been arranged in the second position. This embodiment thus allows to improve the start-up of the process as the control unit learns more about the process via the process sensor signal. In addition, changes in the process system or process are automatically taken into account, making the system more robust over time. Such changes may e.g. occur due to wear on components such as piping, pumps, or valves. It may also happen that conditions of the inlet material flow or of further inlet material flows change, e.g. if the operators adjust the flow rate, pressure, or temperature.

Optionally, the control unit is configured to control the upstream control valve based on a process sensor signal. The process sensor signal in this embodiment may be provided the same as the process sensor explained above; however, it is also possible that multiple process sensors are provided, e.g. being different types of sensors or measuring at different locations. The process sensor signal represents the actual situation downstream of the valve system. Based on this, the control unit can determine whether this situation is within a desired range. In case it is not, the control unit can control the upstream control valve accordingly. For example, if the process sensor signal indicates that the pressure of the process flow is changing, the control unit can control the upstream control valve to counteract this change.

Optionally, the control unit is configured to control the upstream control valve based on a process system signal received during one or more prior processes in the process system. Similarly as explained above with reference to the determination of the specification range based on the process sensor signal received during one or more prior processes, this embodiment allows to improve the control of the upstream control valve based the control unit learning from the prior processes.

In embodiments, the control unit is configured to determine the specification range based on an artificial intelligence model. For example, an artificial intelligence model may be configured to be fed with data based on simulations of a process system comprising one or more feeding systems according to the invention. The artificial intelligence model may e.g. be configured to be fed with data based on (historic) measurements from one or more sensors in the process system and/or feeding systems, e.g. where the respective feeding system is part of or similar systems on other locations. In the artificial intelligence model, different components and sensors may be simulated as objects. The artificial intelligence model may e.g. be configured to apply machine learning. The artificial intelligence model may e.g. be configured to apply neural networks.

In embodiments, the circulation loop further comprises a downstream control valve. The downstream control valve can be embodied as any of the known control valves, for example as a back-pressure regulator, a gate valve, or a butterfly valve. The downstream control valve can be arranged in a plurality of positions, said positions causing mutually different pressure-drops over the downstream control valve. The downstream control valve may comprise an actuator for arranging the downstream control valve is said plurality of positions. In embodiments, the control unit is configured to control the downstream control valve.

The downstream control valve is arranged in the circulation loop downstream of the valve system. Thus, when the valve system is in the first position, the inlet material flow is configured to flow through the downstream control valve, and the downstream control valve is configured to subject the inlet material flow to a pressure-drop. When the valve system is in the second position, the inlet material flow is guided towards the process system inlet and does not flow through the downstream control valve.

In practice, when the valve system is switched from the first to the second position, the inlet material flow is flown through different components such as pipes, valves, and the process system. In addition, it may be possible that the inlet material flow is combined with one or more further inlet material flows. The inlet material flow is therefore subjected to different pressure-drops in comparison to when it was priorly circulated in the circulation line while the valve system was in the first position. This change in pressure-drops causes a start-up period before the inlet material flow and process flow reach a steady state. The downstream control valve allows to control the pressure-drop to which the inlet material flow is subjected when the inlet material flow is circulated in the circulation loop while the valve system is in the first position. The downstream control valve can be controlled to reduce the difference in pressure-drop the inlet material flow is subjected to in the first and second position of the valve system. As this difference is reduced, the start-up period may also be reduced. The start-up of the process can thus be improved, and the steady state can be reached faster. In addition, waste may be reduced.

In embodiments, the control unit is configured to control the downstream control valve to emulate a pressure-drop the inlet material flow will be subjected to after arranging the valve system in the second position.

In embodiments, the control unit is configured to receive a process sensor signal from a process sensor configured to measure a second property of a process flow downstream of the feeding system, said process flow comprising at least the inlet material. The control unit is further configured to control the downstream control valve based on the process sensor signal received during one or more prior processes in the process system. The process sensor in this embodiment may be the same as the process sensor explained above; however, it is also possible that a process sensor for measuring a second property and a further process sensor for measuring a further second property are provided. For example, the second property may be a pressure and the further second property may be a flow rate; and/or the second property and further second property may be measured at different locations.

Similarly as explained above with reference to the determination of the specification range based on the process sensor signal received during one or more prior processes, this embodiment allows to improve the control of the downstream control valve based the control unit learning from the prior processes.

In embodiments, the material vessel comprises a material outlet and a material inlet, wherein the circulation loop is configured to guide the inlet material from the material outlet to the material inlet. The material vessel further comprises a gas inlet configured to receive a pressurized gas. The control unit is configured to control a pressure in the material vessel by controlling a supply of pressurized gas to the gas inlet. The gas can e.g. be an inert gas (e.g. nitrogen) or air, possibly filtered.

The pressure of the inlet material flow in the circulation loop is at least in part determined by the pressure in the material vessel. In particular when the valve system is in the first position and the inlet material flow is circulated back into the material vessel, the pressure of the inlet material flow between the valve system and the material vessel is determined in part by the pressure in the material vessel. When the valve system is switched into the second position, the inlet material flow will be subjected to different pressure-drops. By controlling the pressure in the material vessel, the control unit is configured to reduce the difference in pressure between the situation where the valve system is in the first position and the situation where the valve system is in the second position. By reducing this difference, the start-up period can be reduced. The control of the pressure in the material vessel can thus have a similar effect as the control of the downstream pressure valve. It may be possible to combine both solutions or use them separately.

In further embodiments, the system further comprises a main material vessel. The main material vessel comprises a material outlet fluidly connected to an inlet material supply inlet of the material vessel. The main material vessel may e.g. have a larger volume than the material vessel. The main material vessel may be configured to receive a large amount of inlet materials. The main inlet material may be configured to not be pressurized, e.g. being at approximately atmospheric pressure. Pressurizing the large main inlet material may require relatively many resources, e.g. of the pressurized gas. It may therefore be more efficient to provide a smaller material vessel which is pressurized, and provide inlet material from the main material vessel to said smaller material vessel. One or more force units may be arranged between the main material vessel and the material vessel for transferring inlet material from the main material vessel to the material vessel.

In embodiments, the feeding system is embodied as a modular unit. For example, the feeding system may be arranged in a container. For example, the feeding system may be configured to be modularly connected to a process system, optionally together with one or more further feeding systems.

The invention further relates to a flow control system. The flow control system may be incorporated in the feeding system according to the invention, e.g. by incorporating the flow force unit; however, it is also envisaged that the flow control system can be used by itself or for other applications.

The flow control system comprises a flow inlet configured to receive an incoming flow and a flow outlet configured to guide an outgoing flow out of the system. The flow control system further comprises: a first flow line comprising a flow force unit configured to cause a first flow from the flow inlet to the flow outlet, and a first flow sensor configured to measure a first flow rate of the first flow and generate a first flow sensor signal based thereon; and a second flow line comprising a further flow force unit configured to cause a second flow from the flow outlet to the flow inlet, and a second flow sensor configured to measure a second flow rate of the second flow and generate a second flow sensor signal based thereon. The first and second flow sensors can e.g. be mass flow sensors. The flow control system further comprises a control unit is configured to: receive the first flow sensor signal and second flow sensor signal; and control the outgoing flow by controlling the flow force unit and the further flow force unit based on the first flow sensor signal and the second flow sensor signal.

The flow control system thus comprises a first flow from inlet to outlet and a second flow from outlet to inlet. The outgoing flow is the difference between the first and second flow. The first flow is the combination of the incoming flow and the second flow. The flow control system allows to have a relatively high first and second flow, while the incoming and outgoing flow are relatively low. This may in particular be advantageous when the first and second flow sensors are mass flow sensors. Such flow sensors are often preferred in flow processing but have a limited range of flow rates at which they are accurate. Usually the flow sensors are accurate at relatively high flow rates, while it is possible that the outgoing flow should be relatively low, e.g. when a viscous material is to be moved with the flow control system. The flow control system thus allows with the higher first and second flow, that the flow at the flow sensors is high and thus that the measurement is accurate. Similarly, it is possible that the first and/or second force flow unit are inaccurate at low flow rates, which can also be resolved with this flow control system. Thus, the system allows to accurately control the flow over an increased range of flow rates and makes the system more flexible to be used in different situations and with different materials.

In embodiments, the flow control system further comprises a first connection connecting an inlet of the flow force unit with an inlet of the further flow force unit, wherein the first connection comprises a first shut-off valve; a second connection connecting an outlet of the flow force unit with an outlet of the further flow force unit, wherein the second connection comprises a second shut-off valve. Optionally the flow control system further comprises a third connection connecting an outlet of the further flow force unit with the inlet of the flow force unit, wherein the third connection comprises a third shut-off valve. Optionally the flow control system further comprises a fourth connection connecting an outlet of the flow force unit with the inlet of the further flow force unit, wherein the fourth connection comprises a fourth shut-off valve. The connections and the respective shut-off valves allow to arrange the first and further flow force unit not in an arrangement where the further flow force unit returns the flow as explained above, but also arrange them fluidly parallel. The control unit may be configured to control the shut-off valves.

When fluidly in parallel, the flow rate can be doubled. This can e.g. allow to have an outgoing flow above an upper range of capacity or accuracy of the flow force unit or the flow sensor. Thus, the flow control system allows for accurate control at low flows as well as high flows.

In embodiments, the system can comprise a further control valve in the second flow line downstream of the further flow pump, and optionally downstream of the second flow sensor.

The invention further relates to a leak detection system. The leak detection system can optionally be used with one of the systems (e.g. feeding system or flow control system or process system) described herein.

The leak detection system is configured to be arranged in a circulation loop, downstream of a valve system, optionally also downstream of a shut-off valve. When a downstream control valve is present and arranged fluidly between the valve system and the shut-off valve, the leak detection system is also configured to be arranged downstream of the downstream control valve. The leak detection system is configured to determine whether said valve system and/or shut-off valve and/or downstream control valve are leaking. In this context, leaking means that fluid is flowing through in a direction that is intended to be closed, based on the position of the alve system and/or shut-off valve and/or downstream control valve, respectively.

The leak detection system comprises a vessel branch, configured to be fluidly connected to a material vessel. The vessel branch can e.g. be fluidly connected to the circulation loop on an upstream end. The upstream end can be physically connected to the circulation loop at a branch connection. The branch connection is arranged downstream of the valve system and/or shut-off valve and/or downstream control valve.

On a downstream end, the vessel branch can e.g. be fluidly connected to the material vessel. It is also possible that the downstream end of the vessel branch is fluidly connected to the circulation loop, wherein the circulation loop is fluidly connected to the material vessel. The vessel branch can e.g. be a pipe or similar in a suitable diameter.

The vessel branch comprises a branch valve. The branch valve can be any suitable type of valve. A control unit is configured to control the branch valve between an open position and a closed position. The control unit can e.g. be the same control unit that is configured to control other components in the system, although it is also possible to provide a separated leak detection control unit.

The control unit is configured to, after closing the valve system (or arranging the valve system in a second position) and/or shut-off valve and/or downstream control valve, respectively, open the branch valve for emptying the leak detection system into the material vessel. This can be understood as follows. During circulation or other flow of the fluid (e.g. the inlet material), fluid will be present in the leak detection system, including a part of the vessel branch that is downstream of the branch valve. When the closing the valve system (or arranging the valve system in a second position) and/or shut-off valve and/or downstream control valve, is closed, the fluid is no longer flowing through the leak detection system, but the fluid that already was present will remain. This fluid is removed by opening the branch valve, and guided back to the material vessel. The control unit may further be configured to close the branch valve after emptying the leak detection system.

The leak detection system may further comprise a fluid detector, arranged in the circulation line downstream of the branch connection. The fluid detector can be any type of fluid detector suitable for the used fluid. The fluid detector is configured to generate a detector signal when fluid is detected. The control unit is configured to receive the detector signal, and the determine whether a leak is present. Indeed, when liquid is detected while the valve system and/or shut-off valve and/or downstream control valve, respectively, are closed, this is an indication that said the valve system and/or shut-off valve and/or downstream control valve, respectively, is leaking.

Optionally, the leak detection system, or at least the vessel branch and the fluid detector, are arranged on a higher level than the material vessel (inlet). This allows to empty the leak detection system with the aid of gravity.

The invention further relates to a process system. The process system can e.g. be a reactor. The process system can e.g. be a tubular reactor, e.g. configured to apply a plug-flow reaction. The process system can e.g. be a continuous stirred-tank reactor. The process system can e.g. be a mixer. The process system can e.g. be a blender. The process system can e.g. be a system configured to subject the inlet material to a post-differentiation process, a post-dilution process, a post-mixing process, a dispersion process. The process system further comprises a first feeding system for feeding a first inlet material to the process system inlet. The first feeding system can e.g. be a feeding system according to any of the embodiments described herein. The process system further comprises a second feeding system for feeding a second inlet material to the process system inlet. The second feeding system can e.g. be a feeding system according to any of the embodiments described herein.

Optionally, the first and second feeding system are embodied similarly, although they can also be embodied differently. For example, the first feeding system may comprise a downstream control valve, upstream control valve, or pressurized material vessel, while the second feeding system does not. Optionally, the first and second feeding system are controlled by a single control unit. In this context, the single control unit is considered functionally, meaning that in practice said control unit and its functionalities may be distributed over multiple physical elements. Optionally, the first and second feeding system are controlled by separate control units, wherein said separate control units are configured to communicate with each other. Optionally, the process system may comprise more than two feeding system according to an embodiment described herein, e.g. three, four, five, or ten feeding systems.

The invention further relates to a method for starting a process. Although the method can be performed with the feeding system or process system according to the invention; neither the feeding system, process system, or the method is limited thereto. Features explained herein with reference to the feeding system or process system have the same meaning with respect to the method unless explicitly defined otherwise. Features explained with reference to the feeding system or process system can be applied mutatis mutandis to the method to achieve the similar advantages.

The object of the invention can e.g. be achieved with a method for starting a process, comprising a step of feeding an inlet material to a process system using a feeding system according to any embodiments described herein.

The object of the invention can e.g. be achieved with a method for starting a process in a process system, comprising the following steps: starting a flow force unit and circulating an inlet material flow in a circulation loop, while a valve system in the circulation loop is in a first position, wherein the inlet material flow comprises at least the inlet material; and when the inlet material flow is circulating, arranging the valve system in the second position for guiding the inlet material flow to the process system inlet.

In embodiments, the method comprises a step of, prior to arranging the valve system in the second position, increasing the pressure of the inlet material flow with a pressure force unit, wherein the pressure force unit is arranged upstream of the valve system, and optionally upstream of the flow force unit.

In embodiments, the method comprises a step of, prior to arranging the valve system in the second position, subjecting the inlet material flow to first pressure-drop with an upstream pressure valve, wherein the upstream pressure valve is arranged upstream of the valve system and optionally downstream of the pressure force unit. Optionally the method further comprises a step of, after the valve system has been arranged in the second position, subjecting the inlet material flow to a second pressure-drop with the upstream pressure valve, wherein the first pressure-drop is greater than the second pressure-drop.

In embodiments, the method further comprises a step of measuring a first property of the inlet material flow, wherein the step of arranging the valve system in the second position is performed when the first property is within a specification range.

In embodiments, the method further comprises a step of, during at least one prior process, measuring a second property of a process flow downstream of the feeding system, said process flow comprising at least the inlet material, and determining the specification range based on said second property measured during one or more prior processes in the process system.

In embodiments, the method further comprises a step of determining the specification range based on an artificial intelligence model.

In embodiments, the method further comprises a step of, prior to arranging the valve system in the second position, controlling a downstream control valve arranged in the circulation loop downstream of the valve system to emulate a pressure-drop the inlet material flow will be subjected to after arranging the valve system in the second position.

In embodiments, the method comprises a step of controlling a pressure in the material vessel by supplying a pressurized gas to the material vessel.

The invention further relates to a method for controlling an outgoing flow with a flow control system having a flow inlet and a flow outlet, by: measuring a first flow rate of a first flow from the flow inlet to the flow outlet caused by a flow force unit; measuring a second flow rate of a second flow from the flow outlet to the flow inlet caused by a further flow force unit; controlling an outgoing flow by controlling the flow force unit and the further flow force unit based on the measured first flow rate and second flow rate.

The method for controlling the outgoing flow may optionally be part of the method for feeding an inlet material to a process system, wherein the circulation flow is controlled, wherein the outgoing flow corresponds with the circulation flow.

The invention further relates to a method for detecting a leakage, e.g. of a valve system, and/or a shut-off valve, and/or a downstream control valve, e.g. in a circulation loop. The method may include a step of, after closing the valve system (or arranging the valve system in a second position) and/or shut-off valve and/or downstream control valve, respectively, open a branch valve for emptying a leak detection system into a material vessel. The method may further comprise a step of closing the branch valve. The method may further comprise a step of determining whether a leak is present, based on whether fluid is detected by a fluid detector downstream of a branch connection in the circulation line.

The method for detecting a leakage may optionally be part of the method for feeding an inlet material to a process system, e.g. for detecting a leakage when the valve system is arranged in the second position.

The invention further relates to non-transitory computer-readable instructions configured to, when executed, cause a control unit of a feeding system to perform the method according to any of the embodiments described herein. Said feeding system may e.g. be according to any of the embodiments described herein.

Figure 2B:
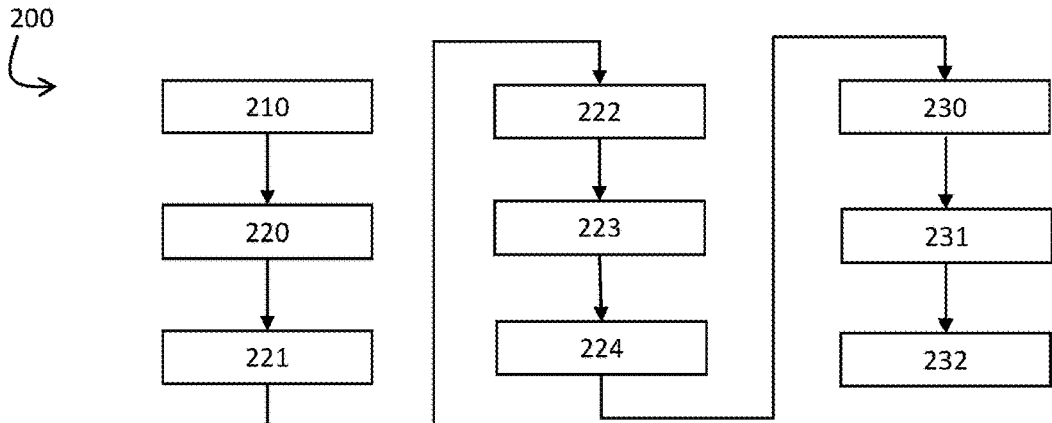
Figure 2C:
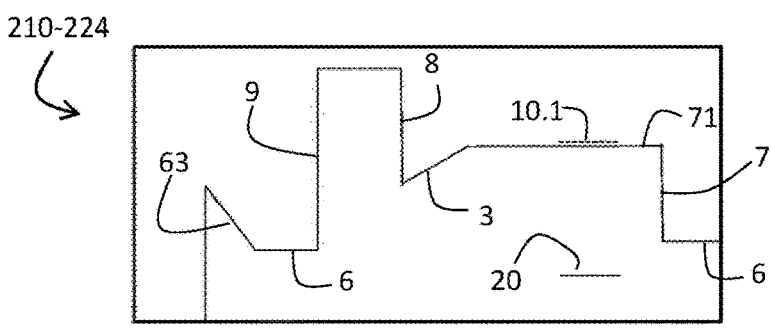
Figure 2D:
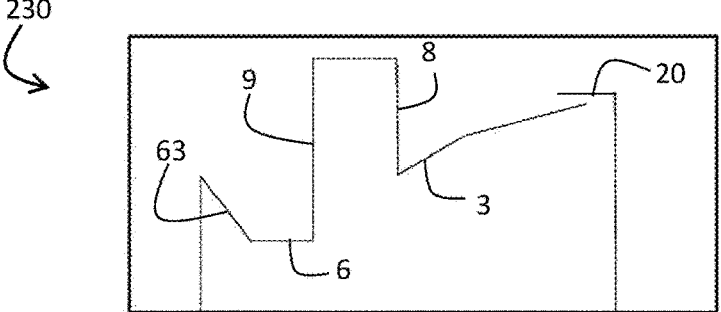
Figure 2E:
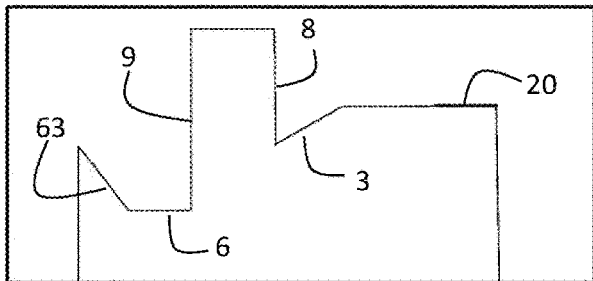
Figure 2F:
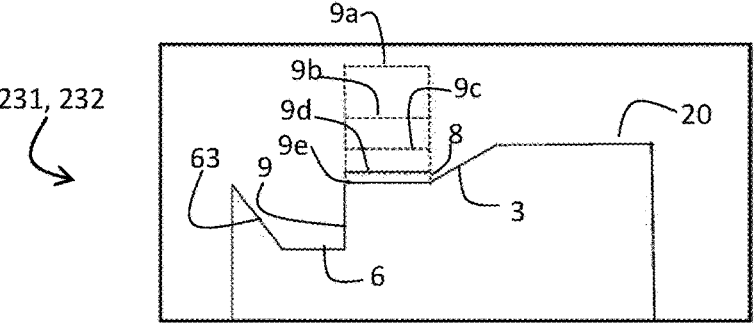
Figure 3:
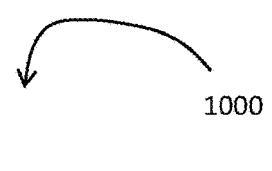
Figure 4:
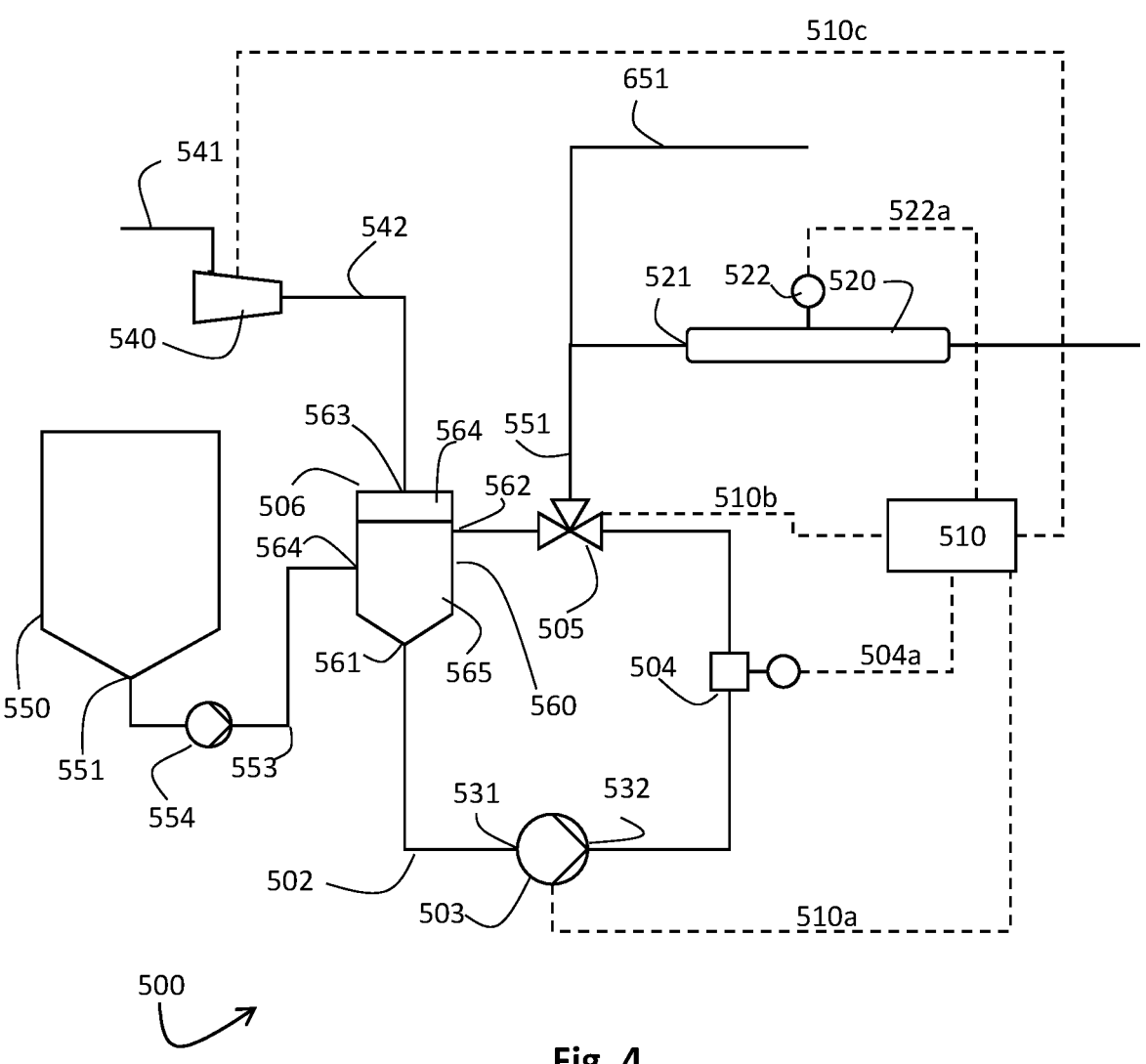
Figure 5A:
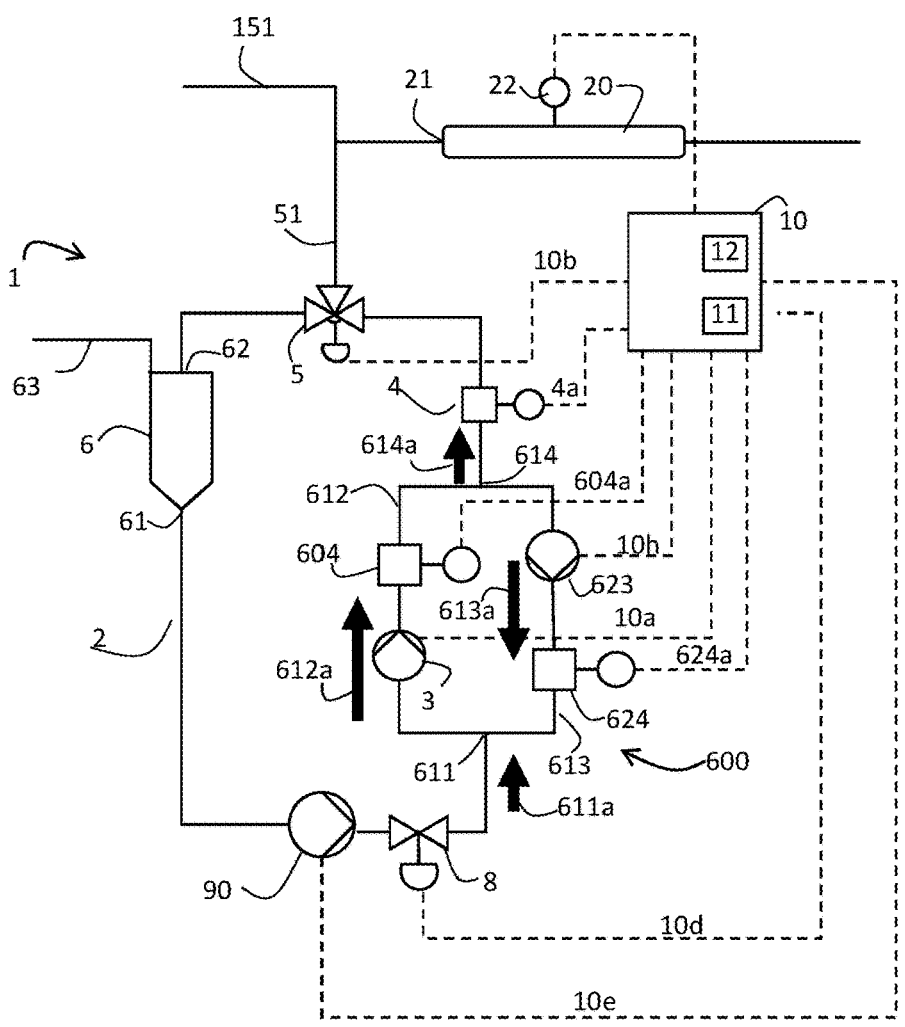
Figure 5B:
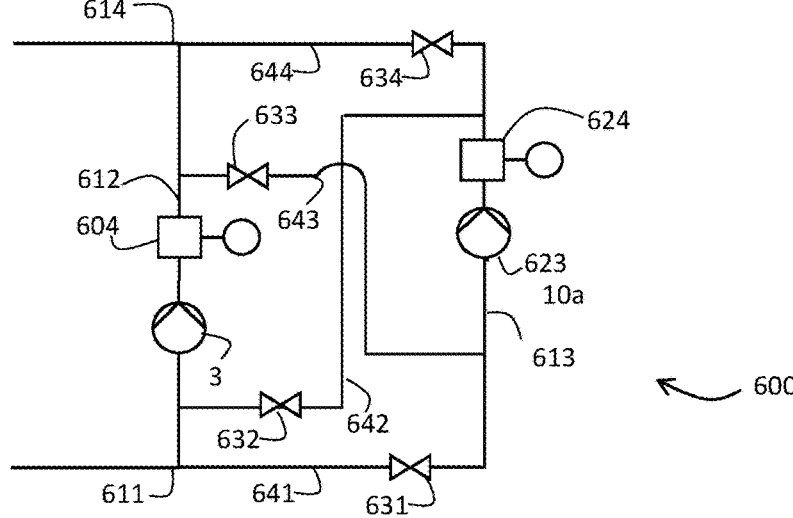
Figure 6:
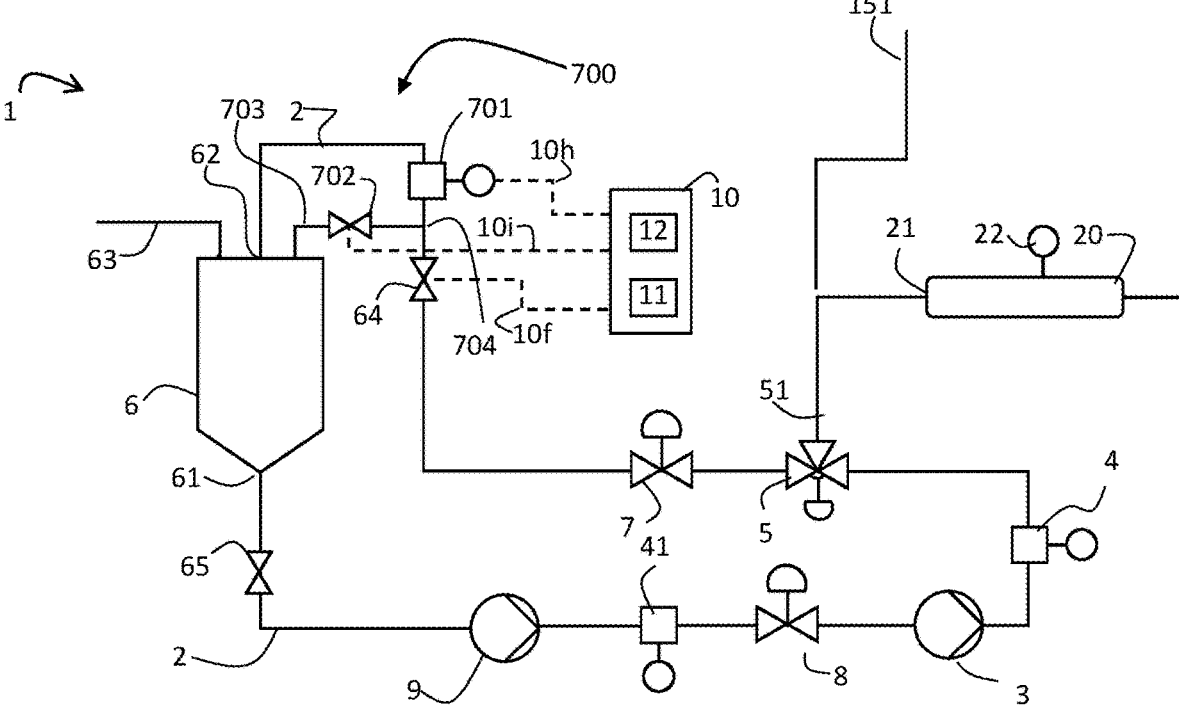

Exemplary embodiments of the invention are described using the figures. It is to be understood that these figures merely serve as example of how the invention can be implemented and are in no way intended to be construed as limiting for the scope of the invention and the claims. Like features are indicated by like reference numerals along the figures. In the figures:

FIG. 1*a*: schematically illustrates a first embodiment of a feeding system;

FIG. 1*b*: schematically illustrates a first embodiment of a method for starting a process;

FIG. 1*c*: schematically illustrates a second embodiment of a method for starting a process;

FIG. 1*d*: schematically illustrates a third embodiment of a method for starting a process;

FIG. 2*a*: schematically illustrates a second embodiment of a feeding system;

FIG. 2*b*: schematically illustrates a fourth embodiment of a method for starting a process;

FIGS. 2*c*-2*f*: schematically illustrate pressure variations of a material flow during a start-up FIG. 3: illustrates a process system;

FIG. 4: schematically illustrates a third embodiment of a feeding system;

FIG. 5*a*-5*b*: illustrate a flow control system;

FIG. 6 schematically illustrates a feeding system having a leak detection system.

FIG. 1*a* illustrates a first embodiment of a feeding system 1. The feeding system 1 can e.g. be used to feed an inlet material to a process system 20. In the process system 20, a process can take place which includes inlet materials. The feeding system 1 shown in FIG. 1 is configured for feeding one inlet material of the process. A further inlet material can be fed via a further process system feeding line 151 which may e.g. be fluidly connected to a non-shown further feeding system. The inlet materials can e.g. include a reactant. The process can e.g. be reaction.

The inlet material in generally moved as a fluid. In case the composition that is to be used in the in the process is a solid, it may be diluted by means of a fluid to facilitate to transportation of the composition.

In the shown example the process system 20 is a tubular reactor, configured to function as a plug flow reactor. The inlet materials are fed simultaneously to a process system inlet 21 and travel through the process system 20 while undergoing the process, in this case the reaction. However, the feeding system 1 can also be used for other types of process systems such as reactors and for mixers. For example, the process system could be a continuous stirred-tank reactor.

The feeding system comprises a material vessel 6. The material vessel 6 is configured to receive the inlet material, in the shown embodiment via an inlet material connection 63. The inlet material connection 63 may e.g. be connected to an inlet material production circuit in (not shown) which the inlet material is produced, or an inlet material storage tank or inlet material main tank (not shown) in which inlet material is stored. In other embodiments, it possible that the inlet material is provided manually into the material vessel 6. Although not illustrated in the figures, a level sensor can be provided for measuring the level of inlet material in the inlet vessel 6. The feeding system 1 further comprises a circulation loop 2. In the circulation loop 2, the inlet material can be circulated. In the shown example the material vessel 6 comprises a material outlet 61, and the inlet material can be circulated through the circulation loop 2 towards a material inlet 62 of the material vessel 6. Thus, the material vessel 6 is part of the circulation loop 2. In other embodiments, it may be possible that the material vessel 6 provides the inlet material to the circulation loop 2, wherein the circulation loop 2 circulates the inlet material without returning it to the material vessel 6.

The circulation loop 2 comprises a flow force unit 3 which in this case is a flow pump 3, in particular a positive displacement pump. A pump inlet 31 of the flow pump 3 is fluidly connected to the material outlet 61 of the material vessel 6. The flow pump 3 further comprises a pump outlet 32. The flow pump 3 is configured to circulate the inlet material in the circulation loop 2 and thereby cause an inlet material flow and control a flow rate of the inlet material flow. The type of flow pump 3 may be chosen dependent on expected characteristics of the inlet material flow in the circulation loop such as viscosity, pressure, and flow rate.

The circulation loop 2 further comprises a valve system 5. In the shown example the valve system 5 comprises a single three-way valve, which may e.g. be change-over valve. However, it is also possible that the valve system 5 comprises more valves and/or other types of valves, e.g. two or more two-way valves. The valve system 5 has a first position and a second position. In the first position, the inlet material is circulated in the circulation loop 2. In said first position the valve system 5 is configured to guide the inlet material flow towards the material inlet 62 of material vessel 6. In said first position the valve system 6 fluidly connects the pump outlet 32 to the material inlet 62 of the material vessel 6. In the second position, the valve system 5 is configured to guide at least a part of the inlet material flow towards the process system inlet 21 via a process system feeding line 51.

The valve system 5 thus allows to switch between circulating inlet material in the circulation loop 2 and feeding inlet material to the process system 20. This allows to only feed inlet material to the process system 20 when this is desired, thereby reducing waste. In addition, the inlet material can first be circulated until the inlet material flow is at a desired flow rate, such that after switching the valve system 5 to the second position, the start-up period is reduced.

FIG. 1a further illustrates that optionally the circulation loop 2 further comprises a circulation sensor 4, which is arranged upstream of the valve system 5. The circulation sensor 4 measures at least a first property of the inlet material flow. In the shown example the circulation sensor 4 is a flow rate sensor such that the first property is a flow rate, but it is also possible that the circulation sensor 4 is e.g. a pressure sensor. It is also possible to provide a pressure sensor and a flow sensos. In particular, the circulation sensor 4 in the shown example is a mass flow sensor. Based on the measured first property, the circulation sensor 4 generates a circulation sensor signal 4a.

The feeding system 1 further comprises a control unit 10. The control unit 10 is configured to control the flow pump 3 for controlling the inlet material flow with a flow pump control signal 10a. The control unit 10 is configured to receive the circulation sensor signal 4a. From said circulation sensor signal 4a the control unit 4 can determine the first property measured by the circulation sensor 4. Based on the circulation sensor signal 4a, the control unit 10 controls the valve system 5 with a valve control signal 10b. In particular, the control unit 10 may control the valve system 5 to be in the first or in the second position, based on the circulation sensor signal 4a.

Optionally the control unit 10 is further configured to control the flow pump 3 based on the circulation sensor signal 4a. For example, if the circulation sensor signal 4a indicates that the flow rate of the inlet material flow if too high or low, the control unit 10 can control the flow pump 3 accordingly.

The communication between the control unit 10 and other components may be wired or wireless, according to any of the known communication protocols suitable for e.g. the environment in which the feeding system 1 is used. The control unit 10 and the respective may comprise input terminals, output terminals, and/or communication terminals to facilitate said communication. The control unit 10 may e.g. comprise a memory 11 for storing received or historic data, measurements, and/or control signals. The memory 11 may also store computer-readable instructions. The control unit 10 comprises a processing unit 10 for processing data, measurements, and/or computer-readable instructions.

Advantageously, the shown system allows to only feed inlet material to the process system 20 if the first property of the inlet material flow is desirable for feeding the inlet material. This can reduce the amount of inlet material that is fed at e.g. incorrect pressure or flow rate, and as such increase the performance of the process system. In many cases this may also reduce the waste, because often the output if the process system is not usable if it is outside of the desirable specifications. The system may in particular be useful during start-up of the process system 20.

With reference to FIGS. 1a-1b, a method 200 for starting a process is illustrated. The method 200 can e.g. be performed by the control unit 10. The control unit 10 may e.g. be caused the perform the method 200 by computer readable instructions.

The method comprises a step 210 of starting the flow pump 3 and circulating the inlet material flow in the circulation loop 2. Before starting the flow pump 3, the valve system 5 should be arranged in the first position, such that the inlet material flow circulates in the circulation loop 2. The method 200 further comprises a step 220 of measuring the first property of the inlet material flow, in this case with the circulation sensor 4. The control unit 10 receives the circulation sensor signal 4a. The method 200 further comprises a step 230 of arranging the valve system 5 in the second position when the first property, as indicated by the circulation sensor signal 4a is within a specification range. Advantageously, the inlet material is only fed to the process system 20 when the inlet material flow is within the specification range. At a start-up, it may take some time before the inlet material flow has reached said specification range. Using the method 200 and feeding system 1 as shown, it is avoided that inlet material if fed before that.

FIG. 1a further illustrates that optionally a process sensor 22 can be provided downstream of the feeding system 1. In the shown example the process sensor 22 arranged such that it can measure a second property of a process flow in the process system 20, but it is also possible to arrange the process sensor 22 at another location. For example, the process sensor 22 can be provided between the process system inlet 21 and the location process system feeding line 51 and the first process system feeding line 151 are combined. It is also possible to arrange the process sensor 22 downstream of the process system 20, such that the flow coming out of the process system 20 is measured, i.e. after undergoing the process. The process sensor 22 may e.g. be a flow sensor such that the second property is a flow rate, or a pressure sensor such that the second property is a pressure. The process sensor 22 is configured to generate process sensor signal 22a based on the measured second property.

The control unit 10 is configured to receive the process sensor signal 22a. the control unit 10 can optionally be configured to determine the specification range, based on said process sensor signal 22a. In particular, the control unit 10 is configured to determine the specification range based on the process sensor signal 22 received during one or more prior processes. Accordingly, FIG. 1c shows a method 200 which in addition comprises a step 221 of measuring the second property and generating the process sensor signal 22a, and determining the specification range based on said second property and/or process sensor signal 22a received during one or more prior processes.

By determining the specification range based on prior processes, the control unit 10 optimizes the specification range as it learns based on the actual system. The control unit 10 may e.g. apply machine-learning programs for this. Over time, the control can thus become more accurate, and the start-up time may even be further reduced. In addition, the control unit 10 can automatically adapt for changes in the system, e.g. due to wear or due to settings in the process system 20 of the further feeding system.

FIG. 1d shows an embodiment wherein the method comprises a step 222 wherein the control unit is configured to determine the specification range based on an artificial intelligence model. For example, an artificial intelligence model may be configured to be fed with data based on simulations of a process system comprising the process system 20 one or more feeding systems 1. The artificial intelligence model may e.g. be configured to be fed with data based on (historic) measurements from one or more sensors 4 in the process system and/or feeding systems, e.g. where the respective feeding system is part of or similar systems on other locations. In the artificial intelligence model, different components and sensors may be simulated as objects. The artificial intelligence model may e.g. be configured to apply machine learning. The artificial intelligence model may e.g. be configured to apply neural networks.

It is noted that although FIG. 1c and FIG. 1d are shown separately, it is also possible that the specification range is based on both the process sensor signal 22a received during one or more prior processes (step 221) and an artificial intelligence model (step 222).

It should be noted that although steps 221 and 222 are shown after step 220 in FIGS. 1c-1d, in practice it is also possible to perform step 221 and/or 222 before step 220, or even before step 210. That is, the specification range can be determined after the start-up has been initiated, or already before, e.g. during a previous process.

The feeding system 1 and methods 200 shown in FIGS. 1a-1d can further be supplemented with several optional components and steps, as is illustrated in FIG. 2a-2b. Although shown in combination in these figures, it will be understood that these components and steps can also be applied individually.

The feeding system 1 in the embodiment shown in FIG. 2a comprises a downstream control valve 7, which is arranged downstream of the valve system 5. When, e.g. during start-up, the valve system 5 is changed from the first position to the second position, the inlet material flow flows towards the process system 20. The inlet material flow may now be subjected to other flow conditions in comparison to the earlier situation wherein it was flowing in the circulation loop 2 towards the material inlet 62. For example, the process system 20 may have a different diameter than the piping in the circulation loop 2, and/or the total flow rate may be increased because further inlet material flows (e.g. from further process feeding line 151) are combined with the inlet material flow. Such changed flow conditions may affect the inlet material flow, because some transition time is required for the inlet material flow to adjust and reach a steady state. During said transition time, the result of the process may be outside of the required specifications, which can e.g. cause waste.

This effect can be mitigated or at least reduced using the downstream control valve 7 as illustrated in the embodiment of FIG. 2a. The downstream control valve 7 can be any type of suitable control valve, e.g. a butterfly valve. The downstream control valve 7 can be set at a plurality of positions for controlling a pressure-drop over the downstream control valve 7. For example, the downstream control valve 7 can be configured to adjust an opening for the inlet material flow to flow through. The control unit 10 is configured to control the downstream control valve 7 by means of a downstream control valve control signal 10c. By controlling the pressure-drop over the downstream control valve 7, the pressure of the inlet material flow upstream of the downstream control valve 7 can be controlled. For example, the pressure of the inlet material flow at the valve system 5 can be controlled.

The downstream control valve 7 can be used to emulate the flow conditions the inlet material flow is subjected to when flowing towards the process system 20. For example, the pressure-drop over the downstream control valve 7 can be controlled to be similar to the pressure-drop the inlet material flow will be subjected to when flowing towards and/or through the process system 20. As such, the change in flow conditions is reduced when the valve system 5 changes from the first position to the second position. The transition time is reduced and the start-up of the process is improved, which may e.g. reduce waste. Accordingly, FIG. 2b illustrates that the method 200 may comprise additionally a step 223 of controlling the downstream control valve 7.

The control unit 10 can in particular be configured to control the downstream control valve 7 based on the process sensor signal 22a received during one or more prior processes. By measuring the actual second property in the process system 20, the flow conditions in the process system 20 can be even better simulated in the circulation loop 2. It is also possible to control the downstream control valve 7 based on the artificial intelligence model.

The feeding system 1 may further comprise an upstream control valve 8 as illustrated in FIG. 2a. The upstream control valve 8 is arranged upstream of the valve system 5. The inlet material thus flows through the upstream control valve when the valve system 5 is in both the first and the second position. The upstream control valve 8 can e.g. be a pressure sustaining valve. The upstream control valve 8 subjects the inlet material flow to a pressure-drop. Said pressure-drop can be controlled by controlling the upstream control valve 8. The control unit 10 is configured to control the upstream control valve 8 with an upstream control valve control signal 10d. In the shown embodiment, the upstream control valve 8 is arranged upstream of the flow pump 3. However, it can also be possible to arrange the upstream control valve 8 downstream of the flow pump 3.

The start-up of the process system 20 can be improved by changing the pressure-drop over the upstream control valve 8. When the flow pump 3 is started with the valve system 5 in the first position, the upstream control valve 8 can subject the inlet material flow to a first pressure-drop. The valve system 5 can be arranged into the second position while maintaining said first pressure-drop. After the valve system 5 has switched to the second position, the pressure-drop can be lowered to a second pressure-drop which is lower than the first pressure-drop. The upstream control valve 8 thus has the opposite effect on the inlet material flow in comparison with the process system 20 during start-up: whereas counter-pressure in the process system 20 increases while the process flow therethrough increases during start-up, the pressure-drop over the upstream control valve 8 decreases. These effects at least partially mitigate each other, which reduces the changes in flow and thus reduces the transition time during start-up. FIG. 2b illustrates that the method 200 may accordingly comprise a step 224 of subjecting the inlet material flow to a first pressure-drop and a step 232 of changing the pressure-drop over the upstream control valve 8 from the first pressure-drop to the second pressure-drop.

The control unit 10 may be configured to control the upstream control valve 8 to gradually transition from the first pressure-drop to the second pressure-drop. The control unit 10 may be configured to control the upstream control valve 8 based on process sensor signal 22a and/or the artificial intelligence model.

FIG. 2a further illustrates that the feeding system 1 may comprise a pressure force unit 9, which is this case is a pressure pump 9, in particular a centrifugal pump. The pressure pump 9 is configured to increase the pressure of the inlet material flow. The pressure pump 9 has a pump inlet 91 which can be fluidly connected to the material outlet 61 of the material vessel 6. The pressure pump 9 has pump outlet 92 which can be fluidly connected to the valve system 5, e.g. via one or more intermediate components. The control unit 10 is configured to control the pressure pump 9 with a pressure pump control signal 10e.

The pressure pump 9 is arranged upstream of the flow pump 3. By providing separate pumps 3, 9 for controlling pressure and flow rate, the control of pressure and flow rate is decoupled. This advantageously allows improved control.

The pressure pump 9 is further arranged upstream of the downstream control valve 8. Thus, the pressure pump 9 first increases the pressure of the inlet material flow, and then the downstream control valve 8 reduces the pressure with the pressure-drop. This may in particular be advantageous during a start-up at the moment that the valve system 5 is switched from the first position to the second position. During such switch, a liquid hammer effect may occur. If the pressure increases and pressure-drop by the pressure pump 9 and the upstream control valve 8 are large enough, the liquid hammer effect can be absorbed. This can reduce the start-up period and/or allow to switch the valve system 5 faster. In addition, the flow rate can be controlled with the flow pump 3 without being affected too much by the liquid hammer effect. Accordingly, the method 200 in FIG. 2b further illustrates a step 223 of increasing the pressure of the inlet material flow with the pressure pump 9.

A pressure sensor 41 may further be arranged downstream of the pressure pump 9. The pressure sensor 41 can be arranged upstream of the upstream control valve 8. The pressure sensor 41 measures the pressure of the inlet material flow and generates a pressure sensor signal 41a based thereon. The control unit 10 receives the pressure sensor signal 41a. The control unit 10 may be configured to control one or more of the pressure pump 9, the upstream control valve 8, the valve system 5, the downstream control valve 7, based on the pressure sensor signal 41a.

After the valve system 5 has been switched to the second position and the start-up period has passed, the risk of the liquid hammer effect is reduced. It may then be waste of energy to still increase the pressure with the pressure pump 9 and reduce the pressure with the upstream control valve 8. Therefore, the method 200 may, besides the step 232, also comprise a step 231 of reducing the pressure increase of the inlet material flow with the pressure pump 9.

FIGS. 2c-2f schematically illustrate, with reference to FIGS. 2a-2b, the pressure variations that a material flow may encounter during start up. It will be understood that these figures are merely a schematic representation showing the pressure variations that are relevant for the explanation that follows. In practice, many additional pressure variations are possible, e.g. minor variations due to pipe bends or other components such as shut-off valves in an open position.

FIG. 2c illustrates the situation where the material flow is circulated in the circulation loop 2 while the valve system 5 is still in the first position, after the steps 210-224 have been performed. The pressure of the material may be increased from e.g. atmospheric pressure in a main material vessel to a higher pressure by one or more force units, and then drop down again while the material flows through inlet material connection 63 towards material vessel 6. When the material flow leaves the material vessel 6, the pressure is increased significantly by pressure pump 9, followed by a pressure decrease by means of pressure-drop subjected by the upstream control valve 8. Although the flow pump 3 is mainly intended for controlling the flow rate, it will also increase the pressure a bit. Finally, the downstream control valve 7 decreases the pressure to the level of the material vessel 6 into which the material flow returns.

FIG. 2c also shows the pressure in the process system 20, which at this moment is still low because the material is not directed into the process system. A dotted line in FIG. 2c shows a pressure setpoint 10.1, which is the expected pressure in the process system 20 after switching the control valve when the process is in the steady state. This can be determined based on the pressure measured by process sensor 22 during one or more prior processes, and/or the artificial intelligence model. It can be seen the downstream control valve 7 is controlled to have an inlet pressure 71 that is controlled towards the pressure setpoint 10.1. The specification range may e.g. be a range around the pressure setpoint 10.1.

FIG. 2*d* illustrates the situation shortly after the valve system 5 has been switched to the second position, thus after step 230 has been performed. The material flow is no longer returned to the material tank 6, but instead directed to the process system 20. The pressure in the process system 20 is very high for a first short period, e.g. a few seconds. This may be a result of a liquid hammer effect and/or inertia, since the flow needs to accelerate towards a steady state flow in the process system 20.

The pressure increase by the pressure pump 9 and subsequent pressure-drop by the upstream control valve 8 reduce the effect of the high pressure in the process system 20. It is, therefore, possible to limit the variation is flow as controlled by the flow pump 3 during this period, and as such the start-up period.

FIG. 2*e* illustrates the situation where the process in the process system 20 has reached the steady state. As can be seen, the pressure in the process system 20 has now reduced, close to the pressure setpoint 10.1 in FIG. 2*c*. If the actual pressure in the process system 20 in FIG. 2*c* would deviate from said pressure setpoint, the control unit 10 may take this into account when determining the specification range for the next start-up.

FIG. 2*f* illustrates that the pressure increase by the pressure pump 9 and the pressure-drop by the upstream control valve 8 can now slowly be reduced to avoid a waste of energy. This corresponds with steps 231 and 232. This is preferably done gradually to avoid any sudden large changes in the process. In FIG. 2*f*, this is illustrated by reducing from a first pressure 9*a*, to a second pressure 9*b*, then to a third pressure 9*c*, then to a fourth pressure 9*d*, and finally a fifth pressure 9*e*. In some embodiments, it may be preferred to that the upstream control valve 8 still applies a small pressure-drop, e.g. by staying at the fourth pressure 9*d* instead of reducing to the fifth pressure 9*e*. This may improve the robustness of the system.

FIG. 2*a* further illustrates that the feeding system 1 can optionally comprise a shut-off valve 64 downstream of the downstream control valve 7. When the valve system 5 is in the second position, the control unit 10 can control the shut-off valve 64 with control signal 10*f* to be closed. This can be done as additional safeguard to avoid that any inlet material flow is returned to the material vessel 6 instead of the process system 20.

FIG. 2*a* further illustrates that the feeding system 1 can optionally comprise a shut-off valve 65 downstream the material outlet 61 of the material vessel 6. The control unit 10 can control the shut-off valve 65 with control signal 10*g* to be closed, when no inlet material flow is desired in the circulation loop 2.

In FIG. 2*a* a pressure sensor 41 is provided downstream of the pressure force unit 9, and a flow sensor 4 is provided downstream of the flow force unit 4. It may be advantageous to measure the flow with the flow sensor 4 at high pressure to reduce e.g. gas or foam bubbles. To achieve this, the upstream control valve 8 can be arranged downstream of the flow sensor (and thus also downstream of the flow force unit 3). An additional pressure sensor can optionally be arranged downstream of the upstream control valve 8 to measure the pressure of the inlet material when leaving the upstream control valve 8.

FIG. 3 illustrates a process system 1000 having a first feeding system 1 and a second feeding system 101. The second feeding system 101 is embodied similarly as the first feeding system 1, wherein similar features are indicated by the same reference numerals added with an "even 100". It will be understood, however, that the first feeding system 1 and second feeding system 101 can be embodied mutually differently. Moreover, both the first and second feeding system 1, 101 are embodied similarly to the feeding system shown in FIG. 2*a*, but also this is not a requirement.

The process system 1000 in FIG. 3 further comprises the process system 20. The first feeding system 1 is configured to feed a first inlet material to the process system inlet 21 of the process system 20. The second feeding system 101 is configured to feed a second inlet material to the process system inlet 21. The first and second inlet material are exposed to a process in the process system 20. It will be understood that although two feeding systems 1, 101 for two inlet materials are shown, in practice it is possible to provide as many feeding systems as there are inlet materials in the process, for example three, four, ten, or a hundred.

FIG. 3 further illustrates the control unit 10. The control unit 10 is configured to communicate with components of the first and second feeding system 1, 101, by receiving signals from sensors and controlling components with control signals. Although the control unit 10 is shown as a single element, in practice it may be distributed over different physical elements. For example, a first PLC can be arranged at the first feeding system 1 and a second PLC may be arranged at the second feeding system 101. It may also be possible to provide a first control unit for the first feeding system 1 and a second control unit for the second feeding system 101, wherein said first and second control unit are configured to communicate with each other.

Both the first and second feeding system 1, 101 may function similar as the feeding systems explained with reference to FIGS. 1*a*-2*b*. To further improve the process in the process system 20, it may be preferred to control the first feeding system 1 while keeping the second feeding system 101 in consideration, and vice versa. In particular, it may be disadvantageous if the first inlet material is already fed to the process system 20 while the second inlet material is not. In such situation, no process would take place and all of the provided first inlet material would be waste. To avoid this, the control unit 10 may be configured to arrange the first valve system 5 and the second valve system 105 in their respective second position, when both the first inlet material flow and the second inlet material flow are within their respective specification range.

Depending on the length of the first inlet material feeding line 51 and the second inlet material feeding line 151 and on the flow rate of the first and second inlet material flow, the first and second valve system 5, 105 can be arranged in the second position at the same time or with a delay.

FIG. 4 illustrates a further aspect that can be provided in a feeding system 500. The feeding system 500 comprises a material vessel 560 which is configured to receive an inlet material. The feeding system 500 further comprises a circulation loop 502. In the circulation loop 502 a flow pump 503, an optional circulation sensor 504, and a valve system 505 are arranged. When the valve system 505 is in a first position, the inlet material is circulated from a material outlet 561 to a material inlet 562 of the material vessel 560 for entering the inlet material back into the material vessel

560. When the valve system 560 is in a second position, the inlet material is guided, via a process system feeding line 551, to a process system inlet 521 of a process system 520. A further inlet material is fed to the process system 520 from a further process system feeding line 651, which may e.g. be fluidly connected to a further feeding system (not shown).

A control unit 510 controls the flow pump 503 with a flow pump control signal 510*a* and the valve system 505 with a valve control signal 510*b*. The control unit 510 can e.g. do this based on a circulation sensor signal 504*a* which is generated by the circulation sensor 504. Optionally the control unit 510 also receives a process sensor signal 522*a* from a process sensor 522.

FIG. 4 further shows a main material vessel 550. In this example, the main material vessel 550 is a relatively large tank, while the material vessel 560 is a smaller tank. The main material vessel 550 is configured to provide inlet material to the material vessel 560. In particular, the main material vessel 550 is fluidly connected to the material vessel 560 via a material outlet 551, an inlet material connection 553, and an inlet material supply inlet 564. Optionally a transfer pump 554 is provided between the main material vessel 550 and the material vessel 560 for transferring the inlet material.

The material vessel 560 further comprises a gas inlet 563. A compressor 540 provides a pressurized gas to the material vessel 550 via a gas connection 542. The gas is provided from a gas source (not shown) to the compressor 540 via a gas source connection 541. Depending on the inlet materials, the gas can e.g. be an inert gas (e.g. nitrogen) or air, possibly filtered.

The material vessel 560 comprises inlet material 565, which is this case is a fluid, and gas 564. The gas 564 is pressurized by the compressor 540 and thus enters the material vessel 560 at relatively high pressure. This pressurizes the material vessel 560, including the inlet material 565 present in the material vessel 560. The inlet material in flowing in the circulation loop 502 is therefore also pressurized.

FIG. 4 further illustrates that the control unit 510 is configured to control the compressor 540, e.g. by means of a compressor control signal 510*c*. By controlling the compressor 520, the control unit 510 can control the pressure of the pressurized gas, and thus also the pressure of the inlet material 565 in the material vessel 560 and in the circulation loop 520. Optionally, a pressure sensor can be provided at the material vessel 560 for measuring the pressure inside the material vessel 560.

This embodiment has several advantages. Firstly, the pressure in of the inlet material can be increased in the material vessel 560 even before start-up of the process system 520 is initiated. This may reduce the time required to reach a desired pressure and flow of an inlet material flow in the circulation loop 502. The start-up to a steady-state process can be achieved faster.

Secondly, the control unit 510 can control the pressure in the material vessel 560 by controlling the compressor 540. When the inlet material flow is circulated while the valve system 505 is in the first position, the inlet material flow is entered back into the material vessel 560 via the material inlet 562. The pressure-drop downstream of the valve system 505 is dependent on the pressure in the material vessel 560. When the valve system 505 is arranged into the second position, the inlet material flow is guided towards the process system 520. Now, the inlet material flow is subjected to different flow conditions. This change in flow conditions causes a start-up period. Said start-up period can be reduced by controlling the pressure in the material vessel 50 such that the inlet material flow is subjected to similar pressure-drops when the valve system is in the first and second position.

The control unit 510 may e.g. be configured to control the pressure in the material vessel 560 based on process sensor signals 522*a* received during one or more prior processes, and/or based on an artificial intelligence model.

Although not explicitly shown, it will be understood that the feeding system 500 shown in FIG. 4 can be combined with any of the systems or components shown in FIGS. 1*a*-3, such as e.g. a downstream control valve 7, an upstream control valve 8, or a pressure pump 9. The principles of controlling the pressure in the material vessel 560 illustrated in FIG. 4 can also be added to the systems shown in FIG. 1*a*-3. In some embodiments, the control of pressure of the inlet material 565 in the material vessel 560 as illustrated in FIG. 4 can replace the function of the downstream control valve shown in other figures.

FIG. 5*a* shows a feeding system 1 comprising a flow control system 600. Although shown here in combination with the feeding system 1, the flow control system 600 can also be used in different applications. In this example, the flow control system 600 is used for controlling the flow rate of the inlet material flow. The flow control system 600 can e.g. be added to a feeding system as shown in FIGS. 1*a*-4.

The flow control system 600 comprises a first flow line 612 comprising the flow force unit 3 and a first flow sensor 604; and a second flow line 613 comprising a further flow force unit 623, and a second flow sensor 624. In the shown example the first flow sensor 604 and the second flow sensor 624 are both mass flow sensors. In the shown example the flow force unit 3 is a flow pump 3 and the further flow force unit 623 is a further flow pump 623. The flow pump 3 causes a first flow 612*a* from a flow inlet 611 to a flow outlet 614, and the further flow pump 623 causes a second flow 613*a* from the flow outlet 614 to the flow inlet 611.

The control unit 10 receives a first flow sensor signal 604*a* from the first flow sensor 604 and second flow sensor signal 624*a* from a second flow sensor 624. The control unit 10 further controls the flow pump 3 with a first pump control signal 10*a* and the second pump 623 with a second pump control signal 10*b*.

In practice mass flow sensors are often used to measure a flow, e.g. a flow of one or more inlet materials to be fed to a process system 20. Mass flow sensors have a good accuracy at high flows; however at low flows they are not always accurate. In particular when the fluid has a high viscosity, the range at which a traditional flow mass flow sensor is accurate may be even smaller. To have an accurate mass flow sensor at low flow rates, the diameter would have to be so small that the pressure-drop would be too high.

The flow control system 600 shown in FIG. 5*a* overcomes this causing a higher flow rate at first and second flow sensor 604, 624. For example, a flow may be entering the flow control system 600 at flow inlet 611 at a small flow rate as indicated by arrow 611*a*. As a mere example, the flow rate can e.g. be 5 kg/h. A mass flow sensor may not be able to accurately measure such a small flow rate. Therefore, the flow pump 3 may be configured to increase to flow rate to a higher flow rate, as indicated by arrow 612*a*. For example, the higher flow rate may be 120 kg/h. At this flow rate, the first mass flow sensor 604 can accurately measure the flow rate.

In the shown example the flow rate at flow outlet 614 may be desired to be 5 kg/h, as indicated by arrow 614*a*. The further flow pump 623 may therefore be configured to circulate the rest of the flow. In this case, the second pump 623 returns a flow rate of 115 kg/h, as indicated by arrow 613a. This flow rate can accurately be measured by the second mass flow sensor 624.

The mass flow control system 600 thus provides a high flow rate in the first and second flow line 612, 613, which allows to accurately measure the flow rate with the first and second flow sensor 604, 624. The flow rate entering the flow inlet 611 and leaving at the flow outlet 614 is kept low. Effectively, a small overall flow rate can accurately be measured. Since the flow rates can accurately be measured, it is also possible the accurately control the outgoing flow 614a. The flow control system 600 allows to accurately control the flow rate over a wider range of flow rates, materials, and conditions, while using mass flow sensors.

This principle does not only apply to the accuracy of the first and second flow sensor 604, 624, but also the flow pump 3 and the further flow pump 623 may control the flow inaccurately below a lower limit. With the flow control system 600, the flow pump 3 and the further flow pump 623 can be controlled within their optimal range, while still providing a lower outgoing flow rate.

Although FIG. 5a illustrates a pressure force unit 90, I will be understood that the principle of the mass flow control system 600 can also be used in a system without pressure force unit 90.

Although FIG. 5a illustrates the upstream control valve 8 being arranged upstream of the mass flow control system 600, it is also possible to arrange the upstream control valve 8 downstream of the mass flow control system 600.

Although not shown in FIG. 5a, an further control valve can be provided in the second flow line 613, downstream of the further flow pump 623, and optionally downstream of the second flow sensor 624.

FIG. 5b illustrates a possible embodiment of the flow control system 600 in more detail, showing that it is also possible to provide a first connection 641 connecting an inlet of the flow force unit 3 with an inlet of the further flow force unit 623, wherein the first connection 641 comprises a first shut-off valve 631; a second connection 644 connecting an outlet of the flow force unit 3 with an outlet of the further flow force unit 623, wherein the second connection 644 comprises a second shut-off valve 634; a third connection 642 connecting an outlet of the further flow force unit 623 with the inlet of the flow force unit 3, wherein the third connection 642 comprises a third shut-off valve 632; and a fourth connection 643 connecting an outlet of the flow force unit 3 with the inlet of the further flow force unit 623, wherein the fourth connection 643 comprises a fourth shut-off valve 633. Although not illustrated in FIG. 5b, the shut-off valves 631, 632, 633, 634 may be controlled by the control unit.

The shown embodiment with the shut-off valves 631, 632, 633, 634 allows to arrange the flow force unit 3 and further force flow unit 623 fluidly in the situation as shown in FIG. 5a, when shut-off valves 631 and 634 are closed and shut-off valves 633 and 632 are open. In addition, when shut-off valves 631 and 634 are open and shut-off valves 633 and 632 are closed, the flow force unit 3 and further force flow unit 623 ae fluidly arranged in parallel. When in parallel, the flow rate can be doubled, such that the flow force units 3, 623 and flow sensors 604, 624 can be used in their accurate range while the combined flow rate is larger.

As a first example, it can be imaged that the accurate operating range of the flow sensors is 100-2500 kg/h, and accurate operation range of the flow force units 3, 623 is 600-1800 kg/h. For an accurate low flow, the further force flow unit 623 is set to reverse the flow, e.g. the flow force unit 3 pumping at 620 kg/h and the further force flow unit 623 at 619 kg/h. For an accurate high flow, the flow force units 3, 623 can be arranged in parallel. As a result, an accurate working range of 1-3600 kg/h can be achieved, despite the limitations of flow force units 3, 623 and flow sensors 604, 624.

FIG. 6 schematically illustrates a feeding system 1 having a leak detection system 700. Besides the leak detection system 700, the shown feeding system 1 is embodied similarly to the feeding system 1 shown in FIG. 2a. It will be understood that for the sake of clarity, not all reference numbers are indicated, and not all connections (e.g. with the control unit 10) are explicitly shown. Moreover, it will be understood that the leak detection system 700 is not limited to the shown feeding system 1 or a feeding system per se, and can also be used for other types of (feeding) systems.

The leak detection system 700 is arranged downstream of the valve system 5, the downstream control unit 7, and the shut-off valve 64. The leak detection system 700 comprises a vessel branch 703, having an upstream end being physically connected to the circulation loop 2 at a branch connection 704. At a downstream end, the vessel branch 703 is fluidly connected to the material vessel 6. In this case, the vessel branch 703 is directly connected to the material vessel 6. In other embodiments, it is possible that the downstream end is connected again to the circulation loop 2, since in this case the circulation loop 2 is also connected to the material vessel 6.

The leak detection system 700 comprises a branch valve 702 arranged in the vessel branch 703. The branch valve 702 is an on/off valve, which can be any type of suitable valve. The control unit 10 is configured to control the branch valve 702 via control signal 10i between an open position and a closed position. The branch valve 702 may e.g. comprise an actuator, which is controlled by the control unit.

The leak detection system 700 further comprises a fluid detector 701. The fluid detector 701 is arranged in the circulation line 2 downstream of the branch connection 704. The fluid detector 701 is configured to generate a detector signal 10h when fluid is detected. The control unit 10 receives the detector signal 10h.

After the valve system 5 is arranged in the second position, the inlet material should flow via process system feeding line 51 to the process system inlet 21. No flow should be present in the part of the circulation loop 2 that is downstream of the valve system 5. The shut-off valve 64 can be closed by the control unit 10 as an additional safety measure. Optionally, also the downstream control valve 7 can be arranged in a closed position. The leak detection system 700 can detect if this fails, and inlet material is still being circulated through the leak detection system 700. This would entail that less inlet material is provided to the process system 20, which may result in the process being outside of specification.

Even if no flow of inlet material is present in the leak detection system 700, there will still be inlet material as such present after moving the valve system 5 to the second position. The control unit 10 can therefore open branch valve 702. Although FIG. 6 generally is a schematical figure, it may be advantageous if the leak detection system 700 (in particular the branch valve 702 and the fluid detector 701) is arranged at a higher level than the material vessel 6. This allows to empty the leak detection system 700 from inlet material, by means of gravity, when the branch valve 702 is opened.

Once the leak detection system 700 is emptied, the branch valve 702 can be closed again. Now, the fluid detector 701 should not detect any fluid. Therefore, when a detector signal 10*h* is received by the control unit 10 that indicates the presence of fluid (in this case inlet material), the control unit 10 can determine that a leakage is present. The control unit 10 can then e.g. stop the system and/or control an alarm system for informing an operator.

As illustrated herein, embodiments of the invention can provide several advantages. It is possible to reduce the start-up time by using the feeding system; stability of the process can be improved with the control of the components in the feeding system; by taking into account prior processes, variations in e.g. conditions are adapted to automatically; using the flow control system, an wide flow rate range can be provided at high accuracy, even for viscous flows at low flow rate; etc.

The systems shown herein are in particular ideal for dynamic behavior where the system must operate in a wide range of conditions and inlet materials with self-adjustment capabilities. This includes for example frequent reformulation, parallel production of different products using the same system, mobile stations that operate in a flexible manufacturing environment etc. . . .

Even when not illustrated in the figures, it will be understood that the systems according to the invention may comprises filters, overpressure safety valves and other materials any position according to process needs and regulations.

As required, detailed embodiments of the present invention are described herein; however, it is to be understood that the disclosed embodiments are merely examples of the invention, which may be embodied in various ways. Therefore, specific structural and functional details disclosed herein are not to be construed as limiting, but merely as a basis for the claims and as a representative basis for teaching those skilled in the art to practice the present invention in various ways in virtually any suitable detailed structure. Not all of the objectives described need be achieved with particular embodiments.

Furthermore, the terms and expressions used herein are not intended to limit the invention, but to provide an understandable description of the invention. The words "a", "an", or "one" used herein mean one or more than one, unless otherwise indicated. The terms "a multiple of", "a plurality" or "several" mean two or more than two. The words "comprise", "include", "contain" and "have" have an open meaning and do not exclude the presence of additional elements. Reference numerals in the claims should not be construed as limiting the invention.

The mere fact that certain "technical" features are described in different dependent claims still allows the possibility that a combination of these technical measures can be used advantageously.

A single processor or other unit can perform the functions of various components mentioned in the description and claims, e.g. of processing units or control units, or the functionality of a single processing unit or control unit described herein can in practice be distributed over multiple components, optionally physically separated of each other. Any communication between components can be wired or wireless by known methods.

The actions performed by the control unit can be implemented as a program, for example computer program, software application, or the like. The program can be executed using computer readable instructions. The program may include a subroutine, a function, a procedure, an object method, an object implementation, an executable application, a source code, an object code, a shared library/dynamic load library and/or other set of instructions designed for execution on a computer system.

A computer program or computer-readable instructions can be stored and/or distributed on a suitable medium, such as an optical storage medium or a solid-state medium supplied with or as part of other hardware, but can also be distributed in other forms, such as via internet or other wired or wireless telecommunication systems.

The invention claimed is:

1. A feeding system for feeding an inlet material to a process system, comprising:
   a material vessel configured to receive the inlet material;
   a circulation loop for circulating an inlet material flow comprising at least the inlet material, wherein the circulation loop comprises:
      a flow force unit configured to cause the inlet material flow;
      a valve system configured to be fluidly connected to a process system inlet of the process system, wherein the valve system has at least:
         a first position for circulating the inlet material flow in the circulation loop; and
         a second position for guiding the inlet material flow to the process system inlet;
      a pressure force unit configured to increase a pressure of the inlet material flow, wherein the pressure force unit is arranged upstream of the valve system; and
      an upstream control valve configured to subject the inlet material flow to a pressure-drop, wherein the upstream pressure valve is arranged upstream of the valve system;
   a control unit configured to control flow force unit, the valve system, the pressure force unit, and the upstream pressure control unit, wherein the control unit is configured to control a start-up of the feeding system by:
      starting the flow force unit for circulating the inlet material flow in the circulation loop, while the valve system is arranged in the first position; control the pressure force unit to increase the pressure of the inlet material flow; control the upstream control valve to subject the inlet material flow to a first pressure-drop;
      when the inlet material flow is circulating, arrange the valve system in the second position;
      after the valve system has been arranged in the second position, control the upstream control valve to subject the inlet material flow to a second pressure-drop, wherein the first pressure-drop is greater than the second pressure-drop.

2. The feeding system according to claim 1, wherein,
   the pressure force unit is arranged upstream of the flow force unit;
   the upstream control valve is arranged downstream of the pressure force unit.

3. The feeding system according to claim 1, wherein the upstream control valve is arranged upstream of the flow force unit.

4. The feeding system according to claim 1,
   further comprising a circulation sensor configured to measure at least a first property of the inlet material flow and configured to generate a circulation sensor signal based on the measured first property, wherein the circulation sensor is arranged upstream of the valve system, wherein optionally the circulation sensor is arranged downstream of the flow force unit;
   wherein the control unit is configured to
      receive the circulation sensor signal, control the valve system between the first and second position, based on at least the circulation sensor signal;

during the start-up of the feeding system, arrange the valve system in the second position when the circulation sensor signal indicates that the first property is within a specification range.

5. The feeding system according to claim 4, wherein the control unit is configured to receive a process sensor signal from a process sensor configured to measure a second property of a process flow downstream of the feeding system, said process flow comprising at least the inlet material;

is configured to determine the specification range based on the process sensor signal received during one or more prior processes in the process system.

6. The feeding system according to claim 4, wherein the control unit is configured to determine the specification range based on an artificial intelligence model.

7. The feeding system according to claim 1, wherein the circulation loop further comprises a downstream control valve arranged in the circulation loop downstream of the valve system, wherein the control unit is configured to control the downstream control valve.

8. The feeding system according to claim 1, comprising a flow control system, wherein the flow control system:

comprises a flow inlet configured to receive an incoming flow and a flow outlet configured to guide an outgoing flow;

a first flow line comprising the flow force unit configured to cause a first flow from the flow inlet to the flow outlet, and a first flow sensor configured to measure a first flow rate of the first flow and generate a first flow sensor signal based thereon;

a second flow line comprising a further flow force unit configured to cause a second flow from the flow outlet to the flow inlet, and a second flow sensor configured to measure a second flow rate of the second flow and generate a second flow sensor signal based thereon;

wherein the control unit is configured to receive the first flow sensor signal and second flow sensor signal;

control the outgoing flow by controlling the flow force unit and the further flow force unit based on the first flow sensor signal and the second flow sensor signal.

9. The feeding system according to claim 1, further comprising a leak detection system arranged in the circulation loop, the leak detection system comprising:

a vessel branch, having an upstream end being physically connected to the circulation loop at a branch connection, and fluidly connected to the material vessel at a downstream end;

a branch valve arranged in the vessel branch, wherein the control unit is configured to control the branch valve between an open position and a closed position;

a fluid detector, arranged in the circulation line downstream of the branch connection, wherein the fluid detector is configured to generate a detector signal when fluid is detected;

wherein the control unit is configured to after arranging the valve system in the second position, open the branch valve for emptying the leak detection system into the material vessel;

close the branch valve after emptying the leak detection system;

the determine whether a leak is present, based on the detector signal.

10. Process system, comprising:

a process system, comprising a process system inlet, a first feeding system for feeding a first inlet material to the process system inlet, wherein the first feeding system is a feeding system according to claim 1, a second feeding system for feeding a second inlet material to the process system inlet, wherein the second feeding system is a feeding system according to claim 1.

11. Method for starting a process, comprising a step of feeding an inlet material to a process system using a feeding system according to claim 1.

12. Method for feeding an inlet material to a process system, comprising the following steps:

starting a flow force unit and circulating an inlet material flow in a circulation loop, while a valve system in the circulation loop is in a first position, wherein the inlet material flow comprises at least the inlet material;

increasing the pressure of the inlet material flow with a pressure force unit, wherein the pressure force unit is arranged upstream of the valve system;

subjecting the inlet material flow to a first pressure-drop with an upstream pressure valve, wherein the upstream pressure valve is arranged upstream of the valve system;

when the inlet material flow is circulating, arranging the valve system in the second position for guiding the inlet material flow to the process system inlet;

after the valve system has been arranged in the second position, subjecting the inlet material flow to a second pressure-drop with the upstream pressure valve, wherein the first pressure-drop is greater than the second pressure-drop.

13. The method according to claim 12, wherein, the pressure force unit is arranged upstream of the flow force unit;

the upstream control valve is arranged downstream of the pressure force unit.

14. The method according to claim 12, wherein the upstream control valve is arranged upstream of the flow force unit.

15. Method according to claim 12, further comprising a step of measuring a first property of the inlet material flow, wherein the step of arranging the valve system in the second position is performed when the first property is within a specification range.

16. Method according to claim 12, further comprising a step of, during at least one prior process, measuring a second property of a process flow downstream of the feeding system, said process flow comprising at least the inlet material, and determining a specification range based on said second property measured during one or more prior processes in the process system.

17. Method according to claim 12, further comprising a step of determining a specification range based on an artificial intelligence model.

18. Method according to claim 12, further comprising a step of, prior to arranging the valve system in the second position, controlling a downstream control valve arranged in the circulation loop downstream of the valve system to emulate a pressure-drop the inlet material flow will be subjected to after arranging the valve system in the second position.

19. Method according to claim 12, further comprising a step of controlling the circulation flow with a flow control system having a flow inlet and a flow outlet, by measuring a first flow rate of a first flow from the flow inlet to the flow outlet caused by the flow force unit, measuring a second flow rate of a second flow from the flow outlet to the flow inlet caused by a further flow force unit, controlling an outgoing flow by controlling the flow force unit and the further flow force unit based on the measured first flow rate and second flow rate, wherein the outgoing flow corresponds with the circulation flow.

20. Method according to claim 12, further comprising the following steps:

after arranging the valve system in a second position, open a branch valve for emptying a leak detection system into a material vessel, closing the branch valve, determining whether a leak is present, based on whether fluid is detected by a fluid detector downstream of a branch connection in the circulation loop.

21. Non-transitory computer readable medium comprising non-transitory computer readable instructions configured to cause a control unit of a feeding system to perform the method according to claim 12.

\* \* \* \* \*